United States Patent
Itami et al.

(10) Patent No.: US 11,149,149 B2
(45) Date of Patent: *Oct. 19, 2021

(54) ANTIFOULING TREATMENT COMPOSITION, TREATING APPARATUS, TREATING METHOD AND TREATED ARTICLE

(71) Applicant: DAIKIN INDUSTRIES, LTD., Osaka (JP)

(72) Inventors: Yasuo Itami, Settsu (JP); Takashi Fuse, Nirasaki (JP); Madoka Okkotsu, Nirasaki (JP); Hidetoshi Kinoshita, Nirasaki (JP); Tatsuya Fukasawa, Nirasaki (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 388 days.

This patent is subject to a terminal disclaimer.

(21) Appl. No.: 15/565,061

(22) PCT Filed: Apr. 5, 2016

(86) PCT No.: PCT/JP2016/061163
§ 371 (c)(1),
(2) Date: Oct. 6, 2017

(87) PCT Pub. No.: WO2016/163368
PCT Pub. Date: Oct. 13, 2016

(65) Prior Publication Data
US 2018/0112079 A1    Apr. 26, 2018

(30) Foreign Application Priority Data
Apr. 10, 2015 (JP) .............................. JP2015-081259

(51) Int. Cl.
  *C09D 4/00* (2006.01)
  *C03C 17/42* (2006.01)
  *C09K 3/18* (2006.01)

(52) U.S. Cl.
  CPC .............. *C09D 4/00* (2013.01); *C03C 17/42* (2013.01); *C09K 3/18* (2013.01);
  (Continued)

(58) Field of Classification Search
  None
  See application file for complete search history.

(56) References Cited

U.S. PATENT DOCUMENTS 6,183,872 B1    2/2001    Tanaka et al.
6,613,434 B1    9/2003    Drevillon et al.
(Continued)

FOREIGN PATENT DOCUMENTS

JP    2002-538312 A    11/2002
JP    2008-503893 A    2/2008
(Continued)

OTHER PUBLICATIONS

Pujari et al., "Organic Monolayers from 1-Alkynes Covalently Attached to Chromium Nitride: Alkyl and Fluoroalkyl Termination", Langmuir, 2013, vol. 29, pp. 10393-10404 (total 12 pages).
(Continued)

*Primary Examiner* — Nicole M. Buie-Hatcher
(74) *Attorney, Agent, or Firm* — Sughrue Mion, PLLC

(57) ABSTRACT

A surface-treating agent for a nitrided surface, including a fluorine-containing compound having a carbon-carbon unsaturated bond at its molecular terminal as a group of —Y-A wherein Y is a single bond, an oxygen atom or a divalent organic group, and A is —CH=CH$_2$ or —C≡CH. Also disclosed is an article treated with the surface-treating agent, a method for forming a surface-treating layer on a
(Continued)

surface of a base material, a surface-treating layer forming apparatus, and a process for producing an article including a base material and a surface-treating layer coating a surface of the base material.

26 Claims, 1 Drawing Sheet

(52) U.S. Cl.
CPC .... *C03C 2217/281* (2013.01); *C03C 2217/76* (2013.01); *C03C 2218/151* (2013.01); *C03C 2218/153* (2013.01)

(56) References Cited

U.S. PATENT DOCUMENTS

| | | | |
|---|---|---|---|
| 2005/0113609 | A1 | 5/2005 | Furukawa |
| 2009/0208728 | A1 | 8/2009 | Itami et al. |
| 2011/0306713 | A1* | 12/2011 | Ueda .................... C08F 2/04 524/265 |
| 2011/0311826 | A1* | 12/2011 | Qiu ..................... C08F 220/24 428/412 |
| 2016/0145433 | A1* | 5/2016 | Corveleyn ............ C08L 71/00 524/539 |

FOREIGN PATENT DOCUMENTS

| | | |
|---|---|---|
| JP | 2008-534696 A | 8/2008 |
| KR | 10-2005-0016660 A | 2/2005 |
| WO | 97/07155 A1 | 2/1997 |
| WO | 2005/123273 A1 | 12/2005 |
| WO | WO-2016035765 A1 * 3/2016 ........... C09D 171/00 |

OTHER PUBLICATIONS

Communication dated Aug. 9, 2018 from the European Patent Office in counterpart Application No. 16776534.6.
Translation of International Preliminary Report on Patentability dated Oct. 19, 2017, in counterpart International Application No. PCT/JP2016/061163.
Ahmed Arafat, "Covalently-bound organic monolayers for biosensor applications", International Journal of Nano and Biomaterials, 2009, pp. 22-30, vol. 2, No. 1/2/3/4/5.
Ahmed Arafat et al., "Covalent Biofunctionalization of Silicon Nitride Surfaces", Langmuir, 2007, pp. 6233-6244, vol. 23, No. 11.
Stephanie Linkohr et al., "A novel bio-functionalization of AlGaN/GaN-ISFETs for DNA-sensors", Physica Status Solidi C: Current Topics in Solid State Physics, 2010, pp. 1810-1813, vol. 7, No. 7-8.
International Search Report for PCT/JP2016/061163 dated Jul. 12, 2016 [PCT/ISA/210].

* cited by examiner

ANTIFOULING TREATMENT COMPOSITION, TREATING APPARATUS, TREATING METHOD AND TREATED ARTICLE

CROSS REFERENCE TO RELATED APPLICATIONS

This application is a National Stage of International Application No. PCT/JP2016/061163 filed Apr. 5, 2016, claiming priority based on Japanese Patent Application No. 2015-081259 filed Apr. 10, 2015, the contents of all of which are incorporated herein by reference in their entirety.

TECHNICAL FIELD

The present invention relates to a surface-treating agent comprising a fluorine-containing compound having a carbon-carbon unsaturated bond at its molecular terminal, a surface-treating apparatus, a surface-treating method, and a surface-treated article.

BACKGROUND ART

A certain fluorine-containing silane compound is known to be able to provide excellent water-repellency, oil-repellency, antifouling property, or the like when it is used in a surface treatment of a base material. A layer (hereinafter, referred to as a "surface-treating layer") formed from a surface-treating agent comprising a fluorine-containing silane compound is applied to various base materials such as a glass, a plastic, a fiber and a building material as a so-called functional thin film.

As such fluorine-containing silane compound, a perfluoropolyether group containing silane compound which has a perfluoropolyether group in its molecular main chain and a hydrolyzable group bonding to a Si atom in its molecular terminal or terminal portion is known (see Patent Documents 1 and 2). When the surface-treating agent comprising the perfluoropolyether group containing silane compound is applied on a base material, a reaction of the hydrolyzable group bonding to a Si atom between the compound and the base material and between the compounds is occurred to form the surface-treating layer.

PRIOR ART DOCUMENT

Patent Document

Patent Document 1: JP 2008-534696 A
Patent Document 2: International Publication No. 97/07155

SUMMARY OF THE INVENTION

Problem to be Solved by the Invention

However, since the surface-treating layer as described above is bonded to the base material by —Si—O—Si— bond, there is a possibility that the bond is cleaved and the durability is decreased under an alkaline environment, particularly a strong alkaline environment.

Therefore, an object of the present invention is to provide a novel surface-treating agent, a novel surface-treating apparatus, and a novel surface-treating method which are able to form a layer having higher alkali resistance.

As a result of intensively studying, the inventors of the present invention have found that by forming a nitrided film on a base material on the surface of which oxygen is present, since the oxygen inhibiting a C=C cleavage is covered with the nitrided film and nitrogen component in the nitrided film facilitate the C=C cleavage reaction, the film formation can be efficiently performed even if an olefin-based material is used. This is because that while the C=C bond is reacted with O on the surface of the base material to form C—O and change in a gas and the gas cannot stay on the base material, the N-terminal forms a C—N bond and becomes part of the molecular of the base material to stay on the base material and function as a part of the film.

In addition, the inventors have found that it is efficient that after forming the nitrided film, or at the same time of formation of the nitrided film, the surface of the base material is terminated with N (nitrogen), further is terminated with H (hydrogen). This is because that since N in the nitrided film has high reactivity, when the base material is transported, N in the nitrided film is reacted with O in the air, and O bonded with N cause the inhibition of the C=C cleavage reaction, while the bonding of N and O is prevented by bonding H to the dangling bond of N in the nitrided film. In addition, since H has an effect to facilitate the C=C cleavage reaction, the surface-treating layer can be efficiently formed by using an olefinic material.

According to the first aspect of the present invention, there is provided a surface-treating agent for a nitrided surface, comprising a fluorine-containing compound having a carbon-carbon unsaturated bond at its molecular terminal as a group of —Y-A wherein Y is a single bond, an oxygen atom or a divalent organic group, and A is —CH—CH$_2$ or —C≡CH.

According to the second aspect of the present invention, there is provided an article comprising a base material and a layer which is formed on a surface of the base material from the surface-treating agent for a nitrided surface of the present invention.

According to the third aspect of the present invention, there is provided a method for forming a surface-treating layer on a surface of a base material comprising the steps of:

performing a pretreatment of the base material so as to form a binding site with a fluorine-containing compound having a carbon-carbon unsaturated bond at its molecular terminal on the surface of the base material; and applying the surface-treating agent for a nitrided surface of the present invention to the base material subjected to the pretreatment to form the surface-treating layer on the surface of the base material, in the pretreatment, an amount of H and an amount of N on the surface of the base material are controlled with a plasma containing nitrogen depending on the surface-treating agent used.

According to the fourth aspect of the present invention, there is provided a method for forming a surface-treating layer on a surface of a base material having a network structure of Si and O at least on its surface comprising the steps of performing a pretreatment so as to form a Si—N bond or a N—H bond on the surface of the base material; and applying the surface-treating agent for a nitrided surface comprising a fluorine-containing compound having a carbon-carbon unsaturated bond at its molecular terminal to the base material subjected to the pretreatment to form the surface-treating layer on the surface of the base material.

According to the fifth aspect of the present invention, there is provided a method for forming a surface-treating layer comprising the steps of performing a pretreatment so as to shield an O atom with a Si—N moiety and/or a N—H moiety and optionally a Si—H moiety on the surface of the base material; and applying the surface-treating agent for a nitrided surface comprising a fluorine-containing compound having a carbon-carbon unsaturated bond at its molecular terminal to the base material subjected to the pretreatment to form the surface-treating layer on the surface of the base material.

According to the sixth aspect of the present invention, there is provided a surface-treating layer forming apparatus for forming a surface-treating layer on a surface of a base material comprising:

a pretreatment unit for performing a pretreatment of the base material to form a binding site with a fluorine-containing compound having a carbon-carbon unsaturated bond at its molecular terminal on the surface of the base material, a surface-treating layer forming unit for applying the surface-treating agent for a nitrided surface of the present invention to the base material subjected to the pretreatment to form the surface-treating layer on the surface of the base material, and in the pretreatment unit, an amount of H and an amount of N on the surface of the base material are controlled with a plasma containing nitrogen depending on the surface-treating agent used.

According to the seventh aspect of the present invention, there is provided a surface-treating layer forming apparatus for forming a surface-treating layer on a surface of a base material having a network structure of Si and O at least on its surface comprising:

a pretreatment unit for performing a pretreatment to form a Si—N bond or a N—H bond on the surface of the base material, and a surface-treating layer forming unit for applying the surface-treating agent for a nitrided surface, comprising a fluorine-containing compound to the base material subjected to the pretreatment to form the surface-treating layer on the surface of the base material.

According to the eighth aspect of the present invention, there is provided a process for producing an article comprising a base material and a surface-treating layer coating a surface of the base material comprising a step of:

contacting the surface-treating agent for a nitrided surface of the present invention to the surface of the base material so that the fluorine-containing compound having a carbon-carbon unsaturated bond at its molecular terminal contained in the surface-treating agent is reacted with a Si—N part or a N—H part of the surface of the base material to form the surface-treating layer on the surface of the base material.

Effect of the Invention

According to the present invention, by using the surface-treating agent comprising a fluorine-containing compound having a carbon-carbon unsaturated bond at the molecular terminal, the surface-treating layer can be efficiently formed on a base material. The surface-treating layer obtained by the present invention has high alkali resistance.

EMBODIMENTS TO CARRY OUT THE INVENTION

Figure 1:
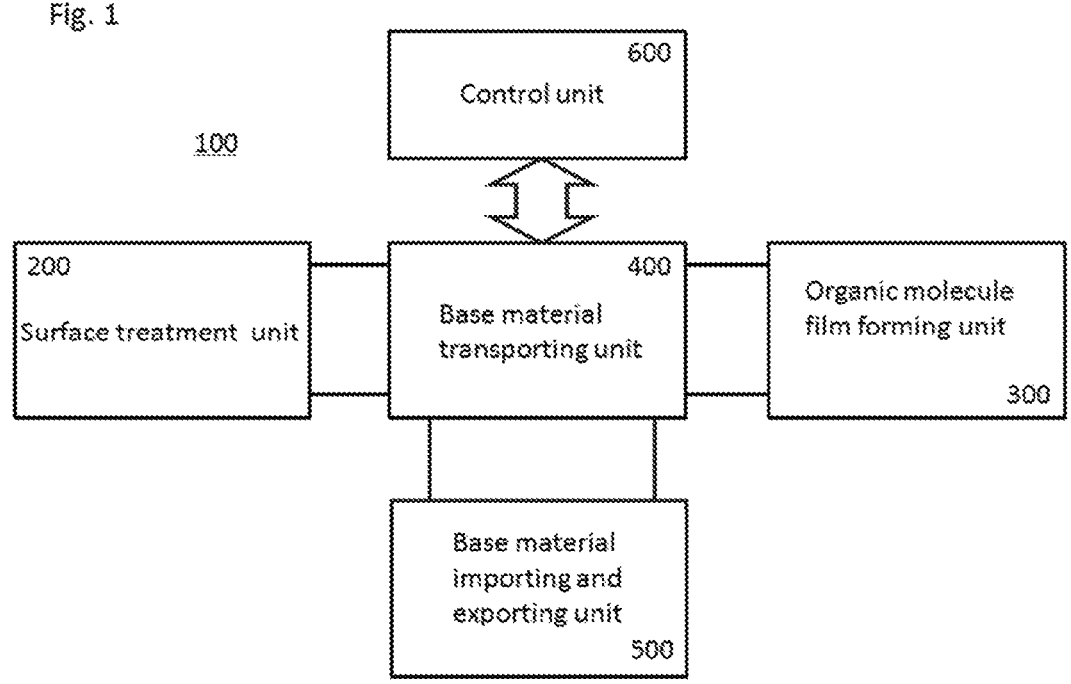
FIG. 1 is a block diagram showing one embodiment of a surface-treating layer forming apparatus for forming the surface-treating layer on a base material.

Hereinafter, the surface-treating agent of the present invention will be described.

The "2-10 valent organic group" as used herein represents a 2-10 valent group containing a carbon atom. Examples of the 2-10 valent organic group include, but are not particularly limited to, a 2-10 valent group obtained by removing 2-9 hydrogen atoms from a hydrocarbon group. For example, examples of the 2-10 valent organic group include, but are not particularly limited to, a divalent group obtained by removing one hydrogen atom from a hydrocarbon group from a hydrocarbon group.

The "hydrocarbon group" as used herein represents a group containing a carbon atom and a hydrogen atom. Examples of the hydrocarbon group include, but are not particularly limited to, a hydrocarbon group having 1-20 carbon atoms which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

As used herein, examples of the substituent of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like, which may be substituted by one or more halogen atoms.

The present invention provides the surface-treating agent comprising a fluorine-containing compound having a carbon-carbon unsaturated bond at its molecular terminal as a group of —Y-A wherein Y is a single bond, an oxygen atom or a divalent organic group, and A is —CH=CH$_2$ or —C≡CH.

Y is a single bond, an oxygen atom or a divalent organic group. Y is preferably a single bond, an oxygen atom or —CR$^{14}_2$—.

R$^{14}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group. R$^{14}$ is preferably a hydrogen atom.

A is —CH=CH$_2$ or —C≡CH. A is preferably —CH=CH$_2$.

In a preferably embodiment, the fluorine-containing compound having a carbon-carbon unsaturated bond at the molecular terminal may be a compound of any of the following formulae (A1), (A2), (B1), (B2), (C1), (C2), (D1), (D2), (E1) and (E2):

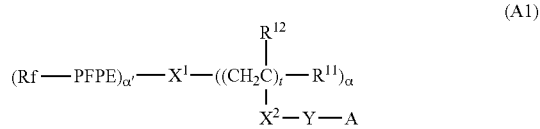

(A1)

-continued

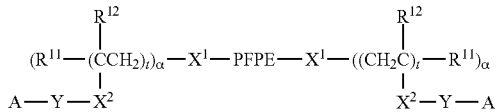
(A2)

$(Rf-PFPE)_{\beta'}-X^3-(Y-A)_\beta$ (B1)

$(A-Y)_\beta-X^3-PFPE-X^3-(Y-A)_\beta$ (B2)

$(Rf-PFPE)_\gamma-X^4-(SiR^a_k R^b_l R^c_m R^d_n)_\gamma$ (C1)

$(R^d_n R^c_m R^b_l R^a_k Si)_\gamma-X^4-PFPE-X^4-(SiR^a_k R^b_l R^c_m R^d_n)_\gamma$ (C2)

$(R^{91}-Rf)_\delta-X^6-(Y-A)_\delta$ (D1)

$(A-Y)_\delta-X^6-Rf-X^6-(Y-A)_\delta$ (D2)

$(Rf-PFPE)_\varepsilon-X^7-(CR^{a2}_{k2} R^{b2}_{l2} R^{c2}_{m2} R^{d2}_{n2})_\varepsilon$ (E1)

$(R^{d2}_{n2} R^{c2}_{m2} R^{b2}_{l2} R^{a2}_{k2} C)_\varepsilon-X^7-PFPE-X^7-(CR^{a2}_{k2} R^{b2}_{l2} R^{c2}_{m2} R^{d2}_{n2})_\varepsilon$ (E2)

Hereinafter, the formulae (A1), (A2), (B1), (B2), (C1), (C2), (D1), (D2), (E1) and (E2) described above are described.

Formulae (A1) and (A2):

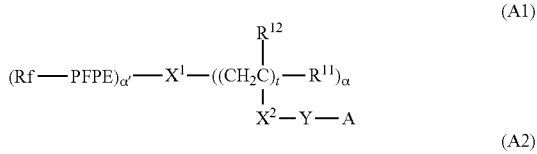
(A1)

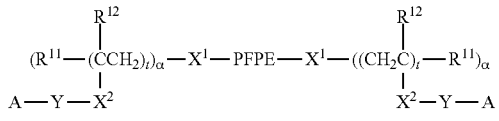
(A2)

In the formula, Rf is an alkyl group having 1-16 carbon atoms which may be substituted by one or more fluorine atoms.

The "alkyl group having 1-16 carbon atoms" in the alkyl having 1-16 carbon atoms which may be substituted by one or more fluorine atoms may be straight or branched, and preferably is a straight or branched alkyl group having 1-6 carbon atoms, in particular 1-3 carbon atoms, more preferably a straight alkyl group having 1-3 carbon atoms.

Rf is preferably an alkyl having 1-16 carbon atoms substituted by one or more fluorine atoms, more preferably a $CF_2H-C_{1-15}$ perfluoroalkylene group, more preferably a perfluoroalkyl group having 1-16 carbon atoms.

The perfluoroalkyl group having 1-16 carbon atoms may be straight or branched, and preferably is a straight or branched perfluoroalkyl group having 1-6 carbon atoms, in particular 1-3 carbon atoms, more preferably a straight perfluoroalkyl group having 1-3 carbon atoms, specifically $-CF_3$, $-CF_2CF_3$ or $-CF_2CF_2CF_3$.

In the formula, PFPE is $-(OC_4F_8)_a-(OC_3F_6)_b-(OC_2F_4)_c-(OCF_2)_d-$, and corresponds to a perfluoro(poly)ether group. Here, a, b, c and d are each independently 0 or an integer of 1 or more and are not particularly limited as long as the sum of a, b, c and d is 1 or more. Preferably, a, b, c and d are each independently an integer of 0 or more and 200 or less, for example an integer of 1 or more and 200 or less, more preferably each independently an integer of 0 or more and 100 or less, for example, an integer of 1 or more and 100 or less. More preferably, the sum of a, b, c and d is 10 or more, preferably 20 or more, and 200 or less, preferably 100 or less. The occurrence order of the respective repeating units in parentheses with the subscript a, b, c or d is not limited in the formula.

Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

In one embodiment, PFPE is $-(OC_3F_6)_b-$ wherein b is an integer of 1 or more and 200 or less, preferably 10 or more and 100 or less, preferably $-(OCF_2CF_2CF_2)_b-$ wherein b is as defined above.

In another embodiment, PFPE is $-(OC_4F)_a-(OC_3F)_b-(OC_2F_4)_c-(OCF_2)_d-$ wherein a and b are each independently an integer of 0 or more, or 1 or more and 30 or less, preferably 0 or more and 10 or less, and c and d are each independently an integer of 1 or more and 200 or less, preferably 10 or more and 100 or less. The sum of a, b, c and d is 10 or more, preferably 20 or more and 200 or less, preferably 100 or less. The occurrence order of the respective repeating units in parentheses with the subscript a, b, c or d is not limited in the formula.

Preferably, PFPE is $-(OCF_2CF_2CF_2CF_2)_a-(OCF_2CF_2CF_2)_b-(OCF_2CF_2)_c-(OCF_2)_d-$ wherein a, b, c and d are as defined above. For example, PFPE may be $-(OCF_2CF_2)_c-(OCF_2)_d-$ wherein c and d are as defined above.

In another embodiment, PFPE is $-(OC_2F_4-R^{15})_{n''}-$. In the formula, $R^{15}$ is a group selected from $OC_2F_4$, $OC_3F_6$ and $OC_4F_8$, or a combination of 2 or 3 groups independently selected from these groups. Examples of the combination of 2 or 3 groups independently selected from $OC_2F_4$, $OC_3F_6$ and $OC_4F_8$ include, but not particularly limited to, for example, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4C_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_8OC_3F_8OC_2F_4-$, $-OC_4F_8OC_2F_4OC_2F_4-$, and the like. n" is an integer of 2-100, preferably an integer of 2-50. In the above-mentioned formula, $OC_2F_4$, $OC_3F_6$ and $OC_4F_8$ may be straight or branched, preferably straight. In this embodiment, PFPE is preferably $-(OC_2F_4-OC_3F_6)_{n''}-$, $-(OC_2F_4-OC_3F_6-OCF_6F_6)_{n''}-$ or $-(OC_2F_4-OC_4F_8)_{n''}-$.

In the formula, $R^{11}$ is each independently at each occurrence a hydrogen atom or a halogen atom. The halogen atom is preferably an iodine atom, a chlorine atom, a fluorine atom.

In the formula, $R^{12}$ is each independently at each occurrence a hydrogen atom or a lower alkyl group. The lower alkyl group is preferably an alkyl group having 1-20 carbon atoms, more preferably an alkyl group having 1-6 carbon atoms.

In the formulae (A1) and (A2), $X^1$ is each independently a single bond or a 2-10 valent organic group. The $X^1$ group is recognized to be a linker which connects between a perfluoropolyether moiety (an Rf—PFPE moiety or —PFPE-moiety) providing mainly water-repellency, surface slip property and the like and a group having a carbon-carbon unsaturated bond (specifically, the A group or a group containing the A group) providing an ability to bind to a base material in the compound of the formula (A1) and (A2). Therefore, the $X^1$ group may be any organic group as long as the compound of the formula (A1) and (A2) can stably exist.

In the formula, a is an integer of 1-9, and α' is an integer of 1-9. α and α' are determined depending on the valence number of the $X^1$ group. In the formula (A1), the sum of α and α' is the valence number of the $X^1$ group. For example, when $X^1$ is a 10 valent organic group, the sum of a and α' is 10, for example, a is 9 and α' is 1, a is 5 and α' is 5, or a is 1 and α' is 9. When $X^1$ is a divalent organic group, α and α' are 1. In the formula (A2), α is a value obtained by subtracting 1 from the valence number of the $X^1$ group.

$X^1$ is preferably a 2-7 valent, more preferably 2-4 valent, more preferably a divalent organic group.

Examples of $X^1$ include, but are not particularly limited to, for example a divalent group of the following formula:

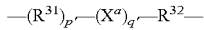

—$(R^{31})_{p'}$—$(X^a)_{q'}$—$R^{32}$— wherein:

$R^{31}$ is a single bond, —$(CH_2)_{s'}$— or an o-, m- or p-phenylene group, preferably —$(CH_2)_{s'}$—, $R^{32}$ is a single bond, —$(CH_2)_{t'}$— or an o-, m- or p-phenylene group, preferably —$(CH_2)_{t'}$—, s' is an integer of 1-20, preferably an integer of 1-6, more preferably an integer of 1-3, further more preferably 1 or 2, t' is an integer of 1-20, preferably an integer of 2-6, more preferably an integer of 2-3, $X^a$ is —$(X^b)_{r'}$—, $X^b$ is each independently at each occurrence a group selected from the group consisting of —O—, —S—, an o-, m- or p-phenylene group, —C(O)O—, —$CONR^{34}$—, —O—$CONR^{34}$—, —$NR^{34}$—, —$Si(R^{33})_2$—, —$(Si(R^{33})_2O)_{m'}$—$Si(R^{33})_2$—, and —$(CH_2)_{n'}$—, $R^{33}$ is each independently at each occurrence a phenyl group, a $C_{1-6}$ alkyl group or a $C_{1-6}$ alkoxy group, preferably a $C_{1-6}$ alkyl group, more preferably a methyl group, $R^{34}$ is each independently at each occurrence a hydrogen atom, a phenyl group or a $C_{1-6}$ alkyl group (preferably a methyl group), m' is each independently an integer of 1-100, preferably an integer of 1-20, n' is each independently at each occurrence an integer of 1-20, preferably an integer of 1-6, more preferably an integer of 1-3, r' is an integer of 1-10, preferably an integer of 1-5, more preferably an integer of 1-3, p' is 0 or 1, and q' is 0 or 1, at least one of p' and q' is 1, and the occurrence order of the respective repeating units in parentheses with the subscript p' or q' is not limited in the formula.

Preferably, $X^1$ may be
a $C_{1-20}$ alkylene group,
—$R^{31}$—$X^c$—$R^{32}$—, or
—$X^d$—$R^{32}$—
wherein $R^{31}$ and $R^{32}$ are as defined above.

More preferably, $X^1$ may be,
a $C_{1-20}$ alkylene group,
—$(CH_2)_{s'}$—$X^c$—,
—$(CH_2)_{s'}$—$X^c$—$(CH_2)_{t'}$—,
—$X^d$—, or
—$X^d$—$(CH_2)_{t'}$—
wherein s' and t' are as defined above.

In the formula, $X^c$ is
—O—,
—S—,
—C(O)O—,
—$CONR^{34}$—,
—O—$CONR^{34}$—,
—$Si(R^{33})_2$—,
—$(Si(R^{33})_2O)_{m'}$—$Si(R^{33})_2$—,
—O—$(CH_2)_{u'}$—$(Si(R^{33})_2O)_{m'}$—$Si(R^{33})_2$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$—, or
—$CONR^{34}$— (o-, m- or p-phenylene)-$Si(R^{33})_2$—
wherein $R^{33}$, $R^{34}$ and m' are as defined above, u' is an integer of 1-20, preferably an integer of 2-6, more preferably an integer of 2-3. $X^c$ is preferably —O—.

In the formula, $X^d$ is
—S—,
—C(O)O—,
—$CONR^{34}$—,
—$CONR^{34}$—$(CH_2)_{u'}$—$(Si(R^{33})_2O)$ m-$Si(R^{33})_2$—,
—$CONR^{34}$—$(CH_2)_{u'}$—$N(R^{34})$—, or
—$CONR^{34}$— (o-, m- or p-phenylene)-$Si(R^{33})_2$—.

More preferably, $X^1$ may be
a $C_{1-20}$ alkylene group,
—$(CH_2)_{s'}$—$X^c$—$(CH_2)_{t'}$—, or
—$X^d$—$(CH_2)_{t'}$—
wherein each symbol is as defined above.

Further, more preferably, $X^1$ is
a $C_{1-20}$ alkylene group,
—$(CH_2)_{s'}$—O—$(CH_2)_{t'}$—,
—$(CH_2)_{s'}$—$Si(R^{33})_2$—$(CH_2)_{t'}$—,
—$(CH_2)_{s'}$—$(Si(R^{33})_2O)_{m'}$—$Si(R^{33})_2$—$(CH_2)_{t'}$—,
—$(CH_2)_{s'}$—O—$(CH_2)_{u'}$—$(Si(R^{33})_2O)_{m'}$—$Si(R^{33})_2$—$(CH_2)_{t'}$—, or
—$(CH_2)_{s'}$—O—$(CH_2)_{t'}$—$Si(R^{33})_2$—$(CH_2)_{u'}$—$Si(R^{33})_2$—$(C_vH_{2v})$—
wherein each symbol is as defined above, v is an integer of 1-20, preferably an integer of 2-6, more preferably an integer of 2-3.

In the formula, —$(C_vH_{2v})$— may be straight or branched, and may be for example —$CH_2CH_2$—, —$CH_2CH_2CH_2$—, —$CH(CH_3)$—, or —$CH(CH_3)CH_2$—.

The above-mentioned $X^1$ group may be substituted by one or more substituents selected from a fluorine atom, a $C_{1-3}$ alkyl group and a $C_{1-3}$ fluoroalkyl group (preferably, a $C_{1-3}$ perfluoroalkyl group).

Specific examples of $X^1$ include, for example:
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CHO(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_2OSi(CH_3)_2(CH_2)$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—, —CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—
—CH₂OCH₂(CH₂)₇CH₂Si(OCH₃)₂OSi(OCH₃)₂(CH₂)₂Si(OCH₃)₂OSi(OCH₃)₂(CH₂)₂—
—CH₂OCH₂CH₂CH₂Si(OCH₃)₂OSi(OCH₃)₂(CH₂)₃—,
—CH₂OCH₂CH₂CH₂Si(OCH₂CH₃)₂OSi(OCH₂CH₃)₂(CH₂)₃—,
—CH₂OCH₂CH₂CH₂Si(OCH₃)₂OSi(OCH₃)₂(CH₂)₂—,
—CH₂OCH₂CH₂CH₂Si(OCH₂CH₃)₂OSi(OCH₂CH₃)₂(CH₂)₂—,
—(CH₂)₂—,
—(CH₂)₃—,
—(CH₂)₄—,
—(CH₂)₅—,
—(CH₂)₆—,
—(CH₂)₂—Si(CH₃)₂—(CH₂)₂—
—CONH—(CH₂)₃—,
—CON(CH₃)—(CH₂)₃—,
—CON(Ph)-(CH₂)₃— (wherein Ph is phenyl),
—CON(CH₃)—(CH₂)₆—,
—CON(Ph)-(CH₂)₆— (wherein Ph is phenyl),
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—S—(CH₂)₃—,
—(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂OSi(CH₃)₂(CH₂)₂—
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂—(CH₂)₂—Si(CH₃)₂—(CH₂)₃—,
—CH₂—O—(CH₂)₃—Si(CH₃)₂—(CH₂)₂—Si(CH₃)₂—CH(CH₃)—CH₂—
—OCH₂—,
—O(CH₂)₃—,
—OCFHCF₂—,

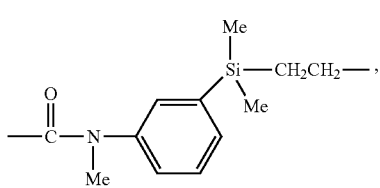

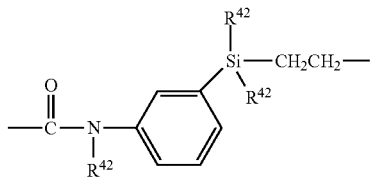

-continued and the like.
Other examples of the $X^1$ include, for example the following groups:

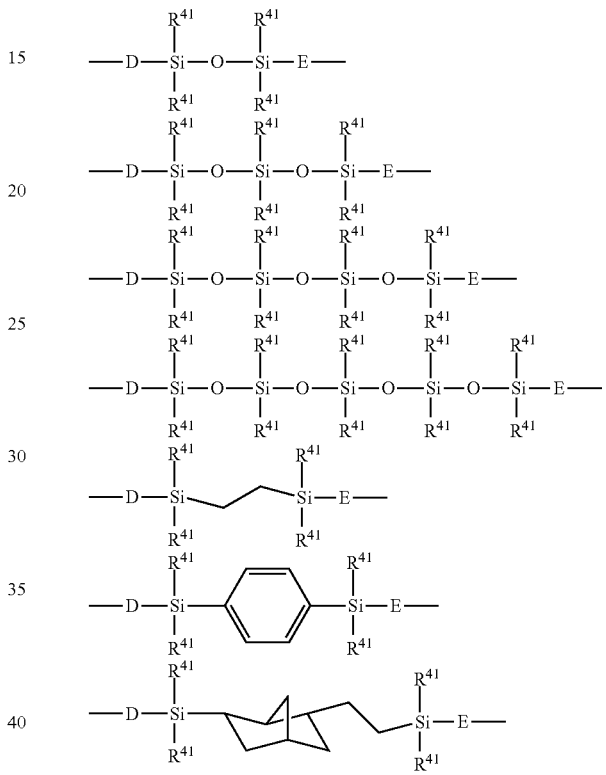

wherein $R^{41}$ is each independently a hydrogen atom, a phenyl group, an alkyl group having 1-6 carbon atoms, or a $C_{1-6}$ alkoxy group, preferably a methyl group;
D is a group selected from
—CH₂O(CH₂)₂—,
—CH₂O(CH₂)₃—,
—CF₂O(CH₂)₃—,
(CH₂)₂—,
(CH₂)₃—,
(CH₂)₄—,
—CONH—(CH₂)₃—,
—CON(CH₃)—(CH₂)₃—,
—CON(Ph)-(CH₂)₃— (wherein Ph is a phenyl group), and wherein $R^{42}$ is each independently a hydrogen atom, a $C_{1-6}$ alkyl group or a $C_{1-6}$ alkoxy group, preferably a methyl group or a methoxy group, more preferably a methyl group, E is —$(CH_2)_n$— wherein n is an integer of 2-6, D binds to PFPE of the main backbone, and E binds to a group opposite to PFPE.

Further other examples of the $X^1$ group include the following groups:

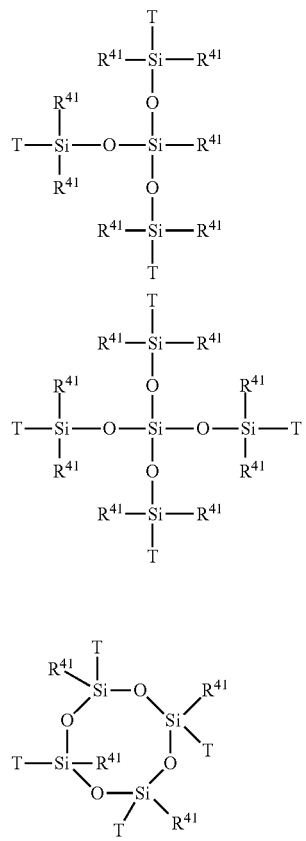

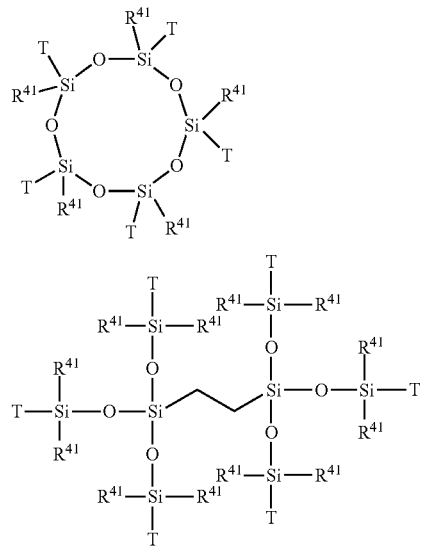

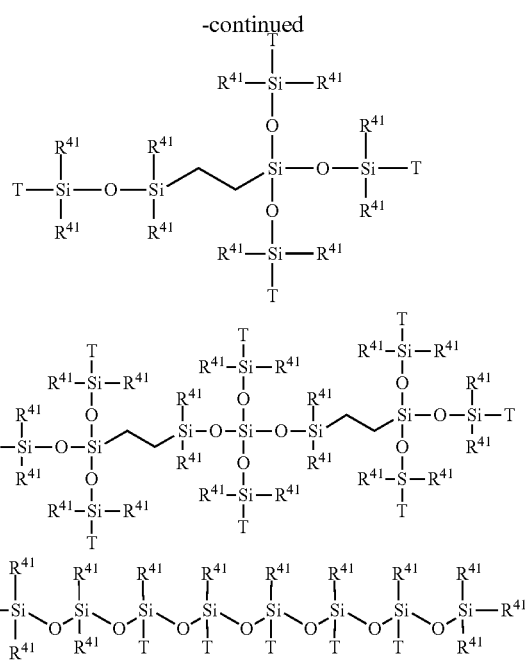

wherein $R^{41}$ is each independently a hydrogen atom, a phenyl group, an alkyl group having 1-6 carbon atoms, or a $C_{1-6}$ alkoxy group, preferably a methyl group;

in each $X^1$ group, any one of T is a following group which binds to PFPE of the main backbone:
—$CH_2O(CH_2)_2$—,
—$CH_2O(CH_2)_3$—,
—$CF_2O(CH_2)_3$—,
$(CH_2)_2$—,
$(CH_2)_3$—,
$(CH_2)_4$—,
—CONH—$(CH_2)_3$—,
—CON($CH_3$)—$(CH_2)_3$—,
—CON(Ph)-$(CH_2)_3$— wherein Ph is phenyl, or

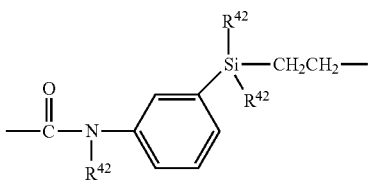

wherein $R^{42}$ is each independently a hydrogen atom, a $C_{1-6}$ alkyl group or a $C_{1-6}$ alkoxy group, preferably a methyl group or a methoxy group, more preferably a methyl group, at least one of the other T is —$(CH_2)_{n''}$— (wherein n" is an integer of 2-6) attached to the group opposite to PFPE, and the others are each independently a methyl group or a phenyl group, if any.

In other embodiment, $X^1$ is a group of the formula: —$(R^{16})_x$—$(CFR^{17})_y$—$(CH_2)_z$—. In the formula, x, y and z are each independently an integer of 0-10, the sum of x, y and z is 1, and the occurrence order of the respective repeating units in parentheses is not limited in the formula.

In the formula, $R^{16}$ is each independently at each occurrence an oxygen atom, phenylene, carbazolylene, —$NR^{20}$— (wherein $R^{20}$ is a hydrogen atom or an organic group) or a divalent organic group. Preferably, $R^{16}$ is an oxygen atom or a divalent polar group.

Examples of the "divalent polar group" in Q include, but are not particularly limited to, —C(O)—, —C(=NR$^{21}$)—, and —C(O)NR$^{21}$— wherein R$^{21}$ is a hydrogen atom or a lower alkyl group. The "lower alkyl group" is, for example, an alkyl group having 1-6 carbon atoms, for example, methyl, ethyl, n-propyl, which may be substituted by one or more fluorine atoms.

In the formula, R$^{17}$ is each independently at each occurrence a hydrogen atom, a fluorine atom or a lower fluoroalkyl group, preferably a fluorine atom. The "lower fluoroalkyl group" is, for example, preferably a fluoroalkyl group having 1-6 carbon atoms, preferably 1-3 carbon atoms, preferably a perfluoroalkyl group having 1-3 carbon atoms, more preferably a trifluoromethyl group, and a pentafluoroethyl group, further preferably a trifluoromethyl group.

In this embodiment, X$^1$ is preferably is a group of the formula: —(O)$_x$—(CF$_2$)$_y$—(CH$_2$)$_z$— wherein x, y and z are as defined above, and the occurrence order of the respective repeating units in parentheses is not limited in the formula.

Examples of the group of the formula: —(O)$_x$—(CF$_2$)$_y$—(CH$_2$)$_z$— include, for example, —(O)$_{x'}$—(CH$_2$)$_{z''}$—O—[(CH$_2$)$_{z'''}$—O-]$_{z''''}$, and —(O)$_{x'}$—(CF$_2$)$_{y''}$—(CH$_2$)$_{z''}$—O—[(CH$_2$)$_{z'''}$—O-]$_{z''''}$ wherein x' is 0 or 1, y", z" and z''' are each independently an integer of 1-10, and z'''' is 0 or 1. It is noted that these groups are attached to PFPE at its left side terminal.

In another embodiment, X$^1$ is —O—CFR$^{13}$—(CF$_2$)$_e$—.

R$^{13}$ is each independently a fluorine atom or a lower fluoroalkyl group. The lower fluoroalkyl group is, for example, a fluoroalkyl group having 1-3 carbon atoms, preferably a perfluoroalkyl group having 1-3 carbon atoms, more preferably a trifluoromethyl group, and a pentafluoroethyl group, further preferably a trifluoromethyl group.

"e" is each independently 0 or 1.

In one embodiment, R$^{13}$ is a fluorine atom, and e is 1.

In the formula, t is each independently an integer of 1-10, preferably an integer of 1-6.

In the formula, X$^2$ is each independently at each occurrence a single bond or a divalent organic group. X$^2$ is preferably an alkylene group having 1-20 carbon atoms, more preferably, —(CH$_2$)$_u$— wherein u is an integer of 0-2.

The compound of the formulae (A1) and (A2) can be obtained, for example, by introducing an iodine into a terminal of a perfluoropolyether derivative corresponding to the Rf—PFPE-moiety as a raw material, and reacting it with a vinyl monomer corresponding to —CH$_2$CR$^{12}$(X$^2$YA)-.

Alternatively, the compound can be produced by synthesizing a compound having a precursor group corresponding to the Y-A moiety, and converting the precursor to the Y-A moiety by using a method known in the art.

The method for converting is not particularly limited. For example, a known reaction for forming a carbon-carbon unsaturated bond, for example an elimination reaction such as dehydration reaction or dehydrohalogenation reaction, or a known method for adding a compound having a carbon-carbon unsaturated bond to a terminal of the molecular corresponding the Y-A moiety or substituting the terminal by the compound having a carbon-carbon unsaturated bond can be used. Those skilled in the art can select a suitable reaction and its reaction condition depending on a structure of the compound.

Formula (B1) and (B2):

(Rf—PFPE)$_{β'}$—X$^3$—(Y-A)$_β$       (B1)

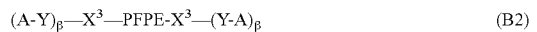

(A-Y)$_β$—X$^3$—PFPE-X$^3$—(Y-A)$_β$       (B2)

In the formulae (B1) and (B2), Rf, PFPE, Y and A are as defined for the formulae (A1) and (A2).

In the formula, X$^3$ is each independently a single bond or a 2-10 valent organic group. The X$^3$ group is recognized to be a linker which connects between a perfluoropolyether moiety (an Rf—PFPE moiety or —PFPE-moiety) providing mainly water-repellency, surface slip property and the like and a group having a carbon-carbon unsaturated bond (specifically, the A group or a group containing the A group) providing an ability to bind to a base material in the compound of the formula (B1) and (B2). Therefore, the X$^3$ group may be any organic group as long as the compound of the formula (B1) and (B2) can stably exist.

In the formula, β is an integer of 1-9, and β' is an integer of 1-9. β and β' are determined depending on the valence number of the X$^3$ group. In the formula (B1), the sum of β and β' is the valence number of the X$^3$ group. For example, when X$^3$ is a 10 valent organic group, the sum of β and β' is 10, for example, β is 9 and β' is 1, β is 5 and β' is 5, or β is 1 and β' is 9. When X$^3$ is a divalent organic group, β and β' are 1. In the formula (B2), β is a value obtained by subtracting 1 from the valence number of the X$^3$ group.

X$^3$ is preferably a 2-7 valent, more preferably 2-4 valent, more preferably a divalent organic group.

Examples of X$^3$ include, but are not particularly limited to, the same groups as that for X$^1$.

The compound of the formulae (B1) and (B2) can be obtained, for example, by introducing a hydroxyl group into a terminal of a perfluoropolyether derivative corresponding to the Rf—PFPE-moiety as a raw material, and subjecting it to Williamson reaction with a compound having a group corresponding to the —Y-A moiety, for example, a compound having a halogenated alkyl group at the terminal.

Alternatively, the compound can be produced by synthesizing a compound having a precursor group corresponding to the Y-A moiety, and converting the precursor to the Y-A moiety by using a method known in the art.

The method for converting is not particularly limited. For example, a known reaction for forming a carbon-carbon unsaturated bond, for example an elimination reaction such as dehydration reaction or dehydrohalogenation reaction, or a known method for adding a compound having a carbon-carbon unsaturated bond to a terminal of the molecular corresponding the Y-A moiety or substituting the terminal by the compound having a carbon-carbon unsaturated bond can be used. Those skilled in the art can select a suitable reaction and its reaction condition depending on a structure of the compound.

Formulae (C1) and (C2):

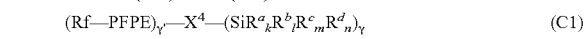

(Rf—PFPE)$_{γ'}$—X$^4$—(SiR$^a_k$R$^b_l$R$^c_m$R$^d_n$)$_γ$       (C1)

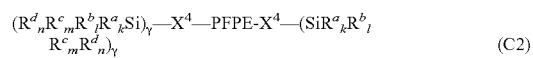

(R$^d_n$R$^c_m$R$^b_l$R$^a_k$Si)$_γ$—X$^4$—PFPE-X$^4$—(SiR$^a_k$R$^b_l$R$^c_m$R$^d_n$)$_γ$       (C2)

In the formulae (C1) and (C2), Rf and PFPE are defined as that for the formulae (A1) and (A2).

In the formula, X$^4$ is each independently a single bond or a 2-10 valent organic group. The X$^4$ group is recognized to be a linker which connects between a perfluoropolyether moiety (an Rf—PFPE moiety or —PFPE-moiety) providing mainly water-repellency, surface slip property and the like and a group having a carbon-carbon unsaturated bond (specifically, the A group or a group containing the A group (—SiR$^a_k$R$^b_l$R$^c_m$R$^d_n$ group)) providing an ability to bind to a base material in the compound of the formula (C1) and (C2). Therefore, the X$^4$ group may be any organic group as long as the compound of the formula (C1) and (C2) can stably exist.

In the formula, γ is an integer of 1-9, and γ' is an integer of 1-9. γ and γ' are determined depending on the valence number of the $X^4$ group. In the formula (C1), the sum of γ and γ' is the valence number of the $X^4$ group. For example, when $X^4$ is a 10 valent organic group, the sum of γ and γ' is 10, for example, γ is 9 and γ' is 1, γ is 5 and γ' is 5, or γ is 1 and γ' is 9. When $X^4$ is a divalent organic group, γ and γ' are 1. In the formula (C2), γ is a value obtained by subtracting 1 from the valence number of the $X^4$ group.

$X^4$ is preferably a 2-7 valent, more preferably 2-4 valent, more preferably a divalent organic group.

Examples of $X^4$ include, but are not particularly limited to, the same group as that for $X^1$.

In the formula, $R^a$ is each independently at each occurrence $-Z-SiR^{71}_p R^{72}_q R^{73}_r R^{74}_s$.

In the formula, Z is each independently at each occurrence an oxygen atom or a divalent organic group.

Preferably, Z is a divalent organic group. Z does not include a group which forms a siloxane bond together with a Si atom (Si atom to which $R^a$ attaches) present in the end of the molecular backbone of the formula (C1) or the formula (C2).

Z is preferably, a $C_{1-6}$ alkylene group, $-(CH_2)_g-O-(CH_2)_h-$ wherein g is an integer of 1-6, and h is an integer of 1-6, or -phenylene-$(CH_2)_i-$ wherein i is an integer of 0-6, more preferably a $C_{1-3}$ alkylene group. These groups may be substituted by one or more substituents selected from, for example, a fluorine atom, a $C_{1-6}$ alkyl group, a $C_{2-6}$ alkenyl group, and a $C_{2-6}$ alkynyl group.

In the formula, $R^{71}$ is each independently at each occurrence $R^{a'}$. $R^{a'}$ has the same definition as that of $R^a$.

In $R^a$, the number of Si atoms which are linearly connected via the Z group is up to five. That is, in $R^a$, when there is at least one $R^{71}$, there are two or more Si atoms which are linearly connected via the Z group in $R^a$. The number of such Si atoms which are linearly connected via the Z group is up to five. It is noted that "the number of such Si atoms which are linearly connected via the Z group in $R^a$" is equal to the repeating number of $-Z-Si-$ which are linearly connected in $R^a$.

For example, one example in which Si atoms are connected via the Z group in $R^a$ is shown below.

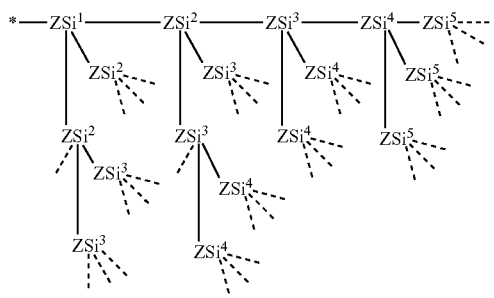

In the above formula, * represents a position binding to Si of the main backbone, and . . . represents that a predetermined group other than ZSi binds thereto, that is, when all three bonds of a Si atom are . . . , it means an end point of the repeat of ZSi. The number on the right shoulder of Si means the number of occurrences of Si which is linearly connected via the Z group from *. In other words, in the chain in which the repeat of ZSi is completed at $Si^2$, "the number of such Si atoms which are linearly connected via the Z group in $R^a$" is 2. Similarly, in the chain in which the repeat of ZSi is completed at $Si^3$, $Si^4$ and $Si^5$, respectively, "the number of such Si atoms which are linearly connected via the Z group in $R^a$" is 3, 4 and 5. It is noted that as seen from the above formula, there are some ZSi chains, but they need not have the same length and may be have arbitrary length.

In a preferred embodiment, as shown below, "the number of such Si atoms which are linearly connected via the Z group in $R^a$" is 1 (left formula) or 2 (right formula) in all chains.

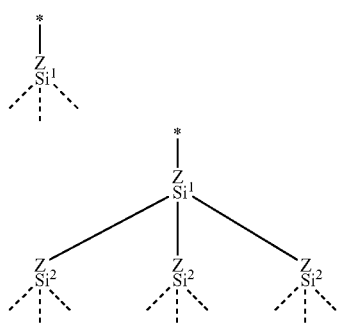

In one embodiment, the number of such Si atoms which are linearly connected via the Z group in $R^a$ is 1 or 2, preferably 1.

In the formula, $R^{72}$ is each independently at each occurrence $-X^5-Y-A$. Y and A are as defined above.

$X^5$ is each independently at each occurrence a single bond or a divalent organic group. $X^5$ is preferably a single bond, a $C_{1-6}$ alkylene group, $-(CH_2)_g-O-(CH_2)_h-$ (wherein g is an integer of 1-6, h is an integer of 1-6) or, -phenylene-$(CH_2)_i-$ (wherein i is an integer of 0-6), more preferably a single bond or a $C_{1-3}$ alkylene group. These groups may be substituted by one or more substituents selected from, for example, a fluorine atom, a $C_{1-6}$ alkyl group, a $C_{2-6}$ alkenyl group, and a $C_{2-6}$ alkynyl group.

$R^{72}$ is preferably $-CH_2-CH=CH_2$.

In the formula, $R^{73}$ is each independently at each occurrence a hydroxyl group or a hydrolyzable group.

The "hydrolyzable group" as used herein represents a group which is able to undergo a hydrolysis reaction.

Examples of the hydrolyzable group include $-OR$, $-OCOR$, $-O-N=C(R)_2$, $-N(R)_2$, $-NHR$, halogen (wherein R is a substituted or non-substituted alkyl group having 1-4 carbon atoms), preferably $-OR$ (an alkoxy group). Examples of R include a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

Preferably, $R^{73}$ is $-OR$ wherein R is a substituted or non-substituted $C_{1-3}$ alkyl group, more preferably a methyl group.

In the formula, $R^{74}$ is each independently at each occurrence a hydrogen atom or a lower alkyl group. The lower alkyl group is preferably an alkyl group having 1-20 carbon atoms, more preferably an alkyl group having 1-6 carbon atoms, more preferably a methyl group.

In the formula, p is each independently at each occurrence an integer of 0-3; q is each independently at each occurrence, an integer of 0-3; r is each independently at each occurrence an integer of 0-3; s is each independently at each occurrence an integer of 0-3. However, p+q+r+s (the sum of p, q, r and s) is 3.

In a preferably embodiment, in the terminal $R^{a'}$ in $R^a$ (when $R^{a'}$ is absent, $R^a$), q is preferably 2 or more, for example 2 or 3, more preferably 3.

In the formula, $R^b$ is each independently at each occurrence —$X^5$—Y-A. $X^5$, Y and A are as defined above. $R^b$ is preferably —$CH_2$—CH=$CH_2$.

In the formula, $R^c$ is each independently at each occurrence a hydroxyl group or a hydrolyzable group.

$R^c$ is preferably a hydroxyl group, —OR, —OCOR, —O—N=$C(R)_2$, —$N(R)_2$, —NHR, halogen (wherein R is a substituted or non-substituted alkyl group having 1-4 carbon atoms), preferably —OR. R is a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group. $R^c$ is more preferably —OR wherein R is a substituted or non-substituted $C_{1-3}$-alkyl group, more preferably methyl group.

In the formula, $R^d$ is each independently at each occurrence a hydrogen atom or a lower alkyl group. The lower alkyl group is preferably an alkyl group having 1-20 carbon atoms, more preferably an alkyl group having 1-6 carbon atoms, further preferably methyl group.

In the formulae, k is each independently at each occurrence an integer of 0-3; l is each independently at each occurrence an integer of 0-3; m is each independently at each occurrence, an integer of 0-3; n is each independently at each occurrence an integer of 0-3.

However, k+l+m+n (the sum of k, l, m and n) is 3.

In the formulae (C1) and (C2), in —$(SiR^a_k R^b_l R^c_m R^d_n)_r$—, at least one Y-A group is present.

The compound of the formulae (C1) and (C2) can be obtained, for example, by introducing a —$SiHal_3$ group (Hal is a halogen) into a perfluoropolyether derivative corresponding to the Rf—PFPE-moiety by hydrosilylation, etc., and subjecting it to a reaction with a Grignard reagent corresponding to the —Y-A moiety, for example, Hal-Mg—$CH_2$—CH=$CH_2$, etc.

Alternatively, the compound can be produced by synthesizing a compound having a precursor group corresponding to the Y-A moiety, and converting the precursor to the Y-A moiety by using a method known in the art.

The method for converting is not particularly limited. For example, a known reaction for forming a carbon-carbon unsaturated bond, for example an elimination reaction such as dehydration reaction or dehydrohalogenation reaction, or a known method for adding a compound having a carbon-carbon unsaturated bond to a terminal of the molecular corresponding the Y-A moiety or substituting the terminal by the compound having a carbon-carbon unsaturated bond can be used. Those skilled in the art can select a suitable reaction and its reaction condition depending on a structure of the compound.

Formulae (D1) and (D2):

(D1)

(D2)

In the formulae (D1) and (D2), Y and A are defined as that for the formulae (A1) and (A2).

In the formula, $X^6$ is each independently a single bond or a 2-10 valent organic group. The $X^6$ group is recognized to be a linker which connects between a perfluoropolyether moiety (an $R^{91}$—Rf— or —Rf'—) providing mainly water-repellency, surface slip property and the like and a group having a carbon-carbon unsaturated bond (specifically, the A group or a group containing the A group) providing an ability to bind to a base material in the compound of the formula (D1) and (D2). Therefore, the $X^6$ group may be any organic group as long as the compound of the formula (D1) and (D2) can stably exist.

In the formula, δ is an integer of 1-9, and is determined depending on the valence number of $X^6$. For example, when $X^6$ is a 10 valent organic group, δ is 9, and when $X^6$ is a divalent organic group, δ is 1.

In the formula, δ is an integer of 1-9, and δ' is an integer of 1-9. δ and δ' are determined depending on the valence number of the $X^6$ group. In the formula (D1), the sum of δ and δ' is the valence number of the $X^6$ group. For example, when $X^6$ is a 10 valent organic group, the sum of 6 and δ' is 10, for example, 6 is 9 and δ' is 1, δ is 5 and δ' is 5, or δ is 1 and δ' is 9. When $X^6$ is a divalent organic group, δ and δ' are 1. In the formula (D2), δ is a value obtained by subtracting 1 from the valence number of the $X^6$ group.

$X^6$ is preferably a 2-7 valent, more preferably 2-4 valent, more preferably a divalent organic group.

Examples of $X^6$ include, but are not particularly limited to, the same group as that for $X^1$.

In the formula, $R^{91}$ is a fluorine atom, —$CHF_2$ or —$CF_3$, preferably a fluorine atom or —$CF_3$.

Rf' is a perfluoroalkylene group having 1-20 carbon atoms. Rf' has preferably 1-12 carbon atoms, more preferably 1-6 carbon atoms, further preferably 3-6 carbon atoms. Examples of the specific Rf' include —$CF_2$—, —$CF_2CF_2$—, —$CF_2CF_2CF_2$—, —$CF(CF_3)$—, —$CF_2CF_2CF_2CF_2$—, —$CF_2CF(CF_3)$—, —$C(CF_3)$—, —$(CF_2)_4CF_2$—, —$(CF_2)_2CF(CF_3)$—, —$CF_2C(CF_3)$—, —$CF(CF_3)CF_2CF_2$—, —$(CF_2)_5CF_2$—, —$(CF_2)_3CF(CF_3)_2$, —$(CF_2)_4CF(CF_3)_2$, —$CF_{17}$. Among them, a straight perfluoroalkylene having 3-6 carbon atoms, for example, —$CF_2CF_2CF_2CF_2$—, —$CF_2CF_2CF_2$—, etc.

The compound of the formulae (D1) and (D2) can be obtained, for example, by introducing iodine into a terminal of a perfluoropolyether derivative corresponding to the Rf—PFPE-moiety as a raw material, and subjecting it to a dehydrohalogenation reaction, etc.

Alternatively, the compound can be produced by synthesizing a compound having a precursor group corresponding to the Y-A moiety, and converting the precursor to the Y-A moiety by using a method known in the art.

The method for converting is not particularly limited. For example, a known reaction for forming a carbon-carbon unsaturated bond, for example an elimination reaction such as dehydration reaction or dehydrohalogenation reaction, or a known method for adding a compound having a carbon-carbon unsaturated bond to a terminal of the molecular corresponding the Y-A moiety or substituting the terminal by the compound having a carbon-carbon unsaturated bond can be used. Those skilled in the art can select a suitable reaction and its reaction condition depending on a structure of the compound.

Formulae (E1) and (E2):

$$(Rf-PFPE)_{\epsilon'}-X^7-(CR^{a2}_{k2}R^{b2}_{l2}R^{c2}_{m2}R^{d2}_{n2})_{\epsilon} \qquad (E1)$$

$$(R^{d2}_{n2}R^{c2}_{m2}R^{b2}_{l2}R^{a2}_{k2}C)_{\epsilon}-X^7-PFPE-X^7-(CR^{a2}_{k2}R^{b2}_{l2}R^{c2}_{m2}R^{d2}_{n2})_{\epsilon} \qquad (E2)$$

In the formulae (E1) and (E2), Rf and PFPE are defined as that for the formulae (A1) and (A2).

In the formula, $X^7$ is each independently a single bond or a 2-10 valent organic group. The $X^7$ group is recognized to be a linker which connects between a perfluoropolyether moiety (i.e., an Rf—PFPE moiety or —PFPE-moiety) providing mainly water-repellency, surface slip property and the like and a moiety providing an ability to bind to a base material (i.e., a group in parentheses with the subscript ε in the compound of the formula (E1) and (E2). Therefore, the $X^7$ group may be any organic group as long as the compound of the formula (E1) and (E2) can stably exist.

In the above formula, ε is an integer of 1-9, ε' is an integer of 1-9. ε and ε' may be varied depending on the valence number of $X^7$. In the formula (E1), the sum of v and ε' is the valence number of the $X^7$ group. For example, when $X^7$ is a 10 valent organic group, the sum of ε and ε' is 10, for example, ε is 9 and ε' is 1, ε is 5 and ε' is 5, or ε is 1 and ε' is 9. When $X^7$ is a divalent organic group, ε and ε' are 1. In the formula (E2), ε is a value obtained by subtracting 1 from the valence number of the $X^7$ group.

$X^7$ is preferably a 2-7 valent, more preferably 2-4 valent, more preferably a divalent organic group.

In one embodiment, $X^7$ is preferably a 2-4 valent, E is 1-3, and ε' is 1.

In another embodiment, $X^7$ is a divalent organic group, ε is 1, and ε' is 1. In this case, the formulae (E1) and (E2) are represented by the following formulae (E1') and (E2').

$$Rf-PFPE-X^7-CR^{a2}_{k2}R^{b2}_{l2}R^{c2}_{m2}R^{d2}_{n2} \qquad (E1')$$

$$R^{d2}_{n2}R^{c2}_{m2}R^{b2}_{l2}R^{a2}_{k2}C-X^7-PFPE-X^7-R^{a2}_{k2}R^{b2}_{l2}R^{c2}_{m2}R^{d2}_{n2} \qquad (E2')$$

Examples of $X^7$ include, but are not particularly limited to, the same groups as that for $X^1$.

Among them, preferable specific $X^7$ is as follows:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)(CH$_2$)$_2$—,
—CH$_2$O(CH)$_2$Si(CH$_3$)$_2$O(Si(CH$_3$)$_2$O)$_2$OSi(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(CH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—(CH$_2$)$_2$—Si(CH$_3$)$_2$—(CH$_2$)$_2$—
—CONH—(CH$_2$)$_3$—,
—CON(CH$_3$)—(CH$_2$)$_3$—,
—CON(Ph)-(CH$_2$)$_3$— (wherein Ph is phenyl),
—CONH—(CH$_2$)$_6$—,
—CON(CH$_3$)—(CH$_2$)$_6$—,
—CON(Ph)-(CH$_2$)$_6$— (wherein Ph is phenyl),
—CONH—(CH$_2$)$_{22}$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$S' (CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

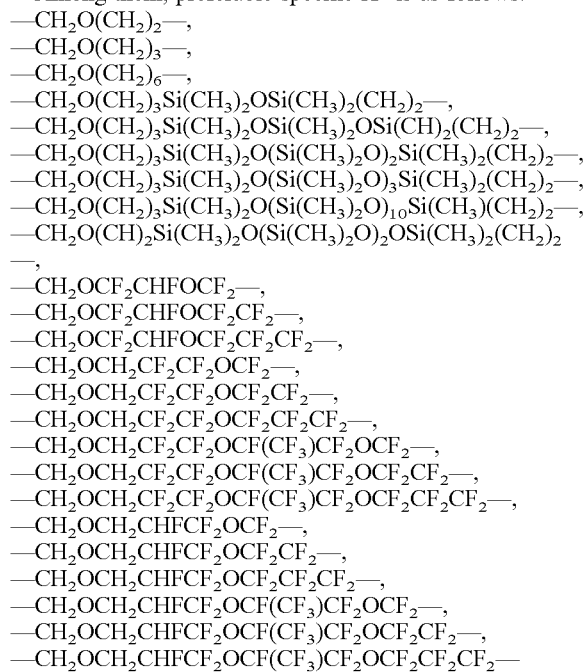

and the like.

In the formula, $R^{a2}$ is each independently at each occurrence $-Z^2-CR^{76}_{p2}R^{76}_{q2}R^{77}_{r2}R^{78}_{s2}$.

In the formula, $Z^2$ is each independently at each occurrence an oxygen atom or a divalent organic group.

$Z^2$ is preferably, a $C_{1-6}$ alkylene group, $-(CH_2)_g-O-(CH_2)_h-$ wherein g is an integer of 0-6, for example an integer of 1-6, and h is an integer of 0-6, for example an integer of 1-6, or -phenylene-$(CH_2)_i-$ wherein i is an integer of 0-6, more preferably a $C_{1-3}$ alkylene group. These groups may be substituted by one or more substituents selected from, for example, a fluorine atom, a $C_{1-6}$ alkyl group, a $C_{2-6}$ alkenyl group, and a $C_{2-6}$ alkynyl group.

In the formula, $R^{75}$ is each independently at each occurrence $R^{a2'}$. $R^{a2'}$ has the same definition as that of $R^{a2}$.

In $R^{a2}$, the number of C atoms which are linearly connected via the $Z^2$ group is up to five. That is, in $R^{a2}$, when there is at least one $R^{75}$, there are two or more Si atoms which are linearly connected via the $Z^2$ group in $R^{a2}$. The number of such C atoms which are linearly connected via the $Z^2$ group is up to five. It is noted that "the number of such C atoms which are linearly connected via the $Z^2$ group in $R^{a2}$ is equal to the repeating number of $-Z^2-C-$ which are linearly connected in $R^{a2}$. This is similar to the description for $R^{a2}$ in the formulae (E1) and (E2).

In a preferable embodiment, "the number of such C atoms which are linearly connected via the $Z^2$ group in $R^{a2}$" is one (the left side formula) or two (the right side formula) in all chains.

In one embodiment, the number of such C atoms which are linearly connected via the $Z^2$ group in $R^{a2}$ is 1 or 2, preferably 1.

In the formula, $R^{76}$ is $-X^8-Y-A$.

$X^8$ is each independently at each occurrence a divalent organic group.

In a preferable embodiment, $X^8$ is a $C_{1-6}$ alkylene group, $-(CH_2)_{g'}-O-(CH_2)_{h'}-$ (wherein g' is an integer of 0-6, for example, an integer of 1-6, and h' is an integer of 0-6, for example an integer of 1-6) or, -phenylene-$(CH_2)_{i'}-$ (wherein i' is an integer of 0-6). These groups may be substituted by one or more substituents selected from, for example, a fluorine atom, a $C_{1-6}$ alkyl group, a $C_{2-6}$ alkenyl group, and a $C_{2-6}$ alkynyl group.

In one embodiment, $X^8$ may be a $C_{1-6}$ alkylene group, $-O-(CH_2)_{h'}-$ or -phenylene-$(CH_2)_{i'}-$. When Y is the above group, light resistance, particularly ultraviolet ray can be higher.

Y and A are is as defined for Y and A in the formulae (A1) and (A2).

$R^{77}$ is each independently at each occurrence a hydroxyl group or a hydrolyzable group.

The "hydrolyzable group" as used herein represents a group which is able to undergo a hydrolysis reaction. Examples of the hydrolyzable group include $-OR$, $-OCOR$, $-O-N=C(R)_2$, $-N(R)_2$, $-NHR$, halogen (wherein R is a substituted or non-substituted alkyl group having 1-4 carbon atoms), preferably $-OR$ (an alkoxy group). Examples of R include a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

Preferably, $R^{77}$ is $-OR$ wherein R is a substituted or non-substituted $C_{1-3}$ alkyl group, more preferably a methyl group.

In the formula, $R^{78}$ is each independently at each occurrence a hydrogen atom or a lower alkyl group. The lower alkyl group is preferably an alkyl group having 1-20 carbon atoms, more preferably an alkyl group having 1-6 carbon atoms, more preferably a methyl group.

In the formula, p2 is each independently at each occurrence an integer of 0-3; q2 is each independently at each occurrence, an integer of 0-3; r2 is each independently at each occurrence an integer of 0-3; s is each independently at each occurrence an integer of 0-3. However, p2+q2+r2+s2 (the sum of p2, q2, r2 and s2) is 3.

In a preferably embodiment, in the terminal $R2^{a'}$ in $R2^a$ (when $R2^{a'}$ is absent, $R2^a$), q is preferably 2 or more, for example 2 or 3, more preferably 3.

In a preferable embodiment, at least one of the terminals of $R^{a2}$ may be $-C(-X^8-Y-A)_2R^{76}_{q2}R^{77}_{r2}R^{78}_{s2}$ wherein the sum of q2, r2 and s2 is 1 or $-C(-X^8-Y-A)_3$, preferably $-C(-X_8-Y-A)_3$.

In the formula, $R^{b2}$ is each independently at each occurrence $-X^8-Y-A$. Here, Y, A and $X^8$ are as defined in $R^{76}$.

In the formula, $R^{c2}$ is each independently at each occurrence a hydroxyl group or a hydrolyzable group. The "hydroxyl group or a hydrolyzable group" is as defined in $R^{77}$.

In the formula, $R^{d2}$ is each independently at each occurrence a hydrogen atom or a lower alkyl group. The lower alkyl group is preferably an alkyl group having 1-20 carbon atoms, more preferably an alkyl group having 1-6 carbon atoms, further preferably methyl group.

In the formula, k2 is each independently at each occurrence an integer of 0-3; l2 is each independently at each occurrence an integer of 0-3; m2 is each independently at each occurrence an integer of 0-3; n2 is each independently at each occurrence an integer of 0-3.

However, the sum of k2, l2, m2 and n2 is 3.

In one embodiment, at least 1 of k2 is 2 or 3, preferably 3.

In one embodiment, k2 is 2 or 3, preferably 3.

In one embodiment, l2 is 2 or 3, preferably 3.

In the formulae (E1) and (E2), at least 1 of q2 is 2 or 3, or at least 1 of l is 2 or 3. That is, in the formula, there are at least 2 $-X^8-Y-A$ groups.

The perfluoro(poly)ether group containing silane compound of the formulae (E1) and (E2) can be prepared by combining the known methods. For example, the compound of the formula (E1') wherein $X^7$ is divalent can be prepared as follows, although the present invention is not limited thereto.

A group containing a double bond (preferably allyl), and halogen (preferably bromo) are introduced into a polyalcohol of $HO-W^1-C(W^2OH)_3$ wherein $W^1$ and $W^2$ are each independently a divalent organic group to obtain a halide compound of $Hal-W^1-C(W^2-O-R-CH=CH_2)_3$ wherein Hal is halogen, for example Br, and R is a divalent organic group, for example alkylene group. Then, the terminal halogen is reacted with a perfluoropolyether group containing alcohol of $R^{PFPE}-OH$ (wherein $R^{PFPE}$ is a perfluoropolyether containing group) to obtain $R^{PFPE}-O-W^1-C(W^2-O-R-CH=CH_2)_3$.

The surface-treating agent of the present invention may be diluted with a solvent, Examples of the solvent include, but are not particularly limited to, for example, a solvent selected from the group consisting of perfluorohexane, $CF_3CF_2CHCl_2$, $CF_3CH_2CF_2CH_3$, $CF_3CHFCHFC_2F_5$, 1,1,1, 2,2,3,3,4,4,5,5,6,6-tridecafluorooctane, 1,1,2,2,3,3,4-heptafluorocyclopentane (ZEORORA H (trade name), etc.), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O)_m(CF_2O)_nCF_2CF_3$ [wherein m and n are each independently an integer of 0 or more and 1000 or less, the occurrence order of the respective repeating units in parentheses with the subscript m or n is not limited in the formula, with the proviso that the sum of m and n is 1 or more.], 1,1-dichloro-2,3,3,3-tetrafluoro-1-propene, 1,2-dichloro-1,3,3,3-tetrafluoro-1-propene, 1,2-dichloro-3,3,3-trichloro-1-propene, 1,1-dichloro-3,3,3-trichloro-1-propene, 1,1,2-trichloro-3,3,3-trichloro-1-propene, 1,1,1,4,4,4-hexafluoro-2-butene. These solvents may be used alone or as a mixture of 2 or more compound.

The above-mentioned surface-treating agent may comprise other components in addition to a fluorine-containing compound having a carbon-carbon unsaturated bond at the molecular terminal. Examples of the other components include, but are not particularly limited to, for example, a (non-reactive) fluoropolyether compound which may be also understood as a fluorine-containing oil, preferably a perfluoro(poly)ether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-mentioned fluorine-containing oil include, but are not particularly limited to, for example, a compound of the following general formula (3) (a perfluoro(poly)ether compound).

(3)

In the formula, $Rf^1$ represents a $C_{1-16}$ alkyl group which may be substituted by one or more fluorine atoms (preferably, a $C_{1-16}$ perfluoroalkyl group), $Rf^2$ represents a $C_{1-16}$ alkyl group which may be substituted by one or more fluorine atoms (preferably, a $C_{1-16}$ perfluoroalkyl group), a fluorine atom or a hydrogen atom, and more preferably, $Rf^1$ and $Rf^2$ is each independently a $C_{1-3}$ perfluoroalkyl group.

Subscripts a', b', c' and d' represent the repeating number of each of four repeating units of perfluoropolyether which constitute a main backbone of the polymer, and are each independently an integer of 0 or more and 300 or less, and the sum of a', b', c' and d' is at least 1, preferably 1-300, more preferably 20-300. The occurrence order of the respective repeating units in parentheses with the subscript α', b', c' or d' is not limited in the formulae. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

Examples of the perfluoropolyether compound of the above general formula (3) include a compound of any of the following general formulae (3a) and (3b) (may be one compound or a mixture of two or more compounds).

(3a)

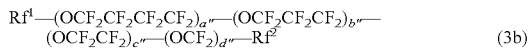
(3b)

In these formulae:
$Rf^1$ and $Rf^2$ are as defined above; in the formula (3a), b" is an integer of 1 or more and 100 or less; and in the formula (3b), a" and b" are each independently an integer of 1 or more and 30 or less, and c" and d" are each independently an integer of 1 or more and 300 or less. The occurrence order of the respective repeating units in parentheses with the subscript a", b", c" or d" is not limited in the formulae.

The above-mentioned fluorine-containing oil may have an average molecular weight of 1,000-30,000. By having such average molecular weight, high surface slip property can be obtained.

The fluorine-containing oil may be contained in the surface-treating agent of the present invention, for example, at 0-500 parts by mass, preferably 0-400 parts by mass, more preferably 5-300 parts by mass with respect to 100 parts by mass of the fluorine-containing compound having a carbon-carbon unsaturated bond at the molecular terminal (as the total mass when two or more compounds are used; hereinafter the same shall apply).

The compound of the general formula (3a) and the compound of the general formula (3b) may be used alone or in combination. The compound of the general formula (3b) is preferable than the compound of the general formula (3a) since the compound of the general formula (3b) provides higher surface slip property than the compound of the general formula (3a). When they are used in combination, the ratio by mass of the compound of the general formula (3a) to the compound of the general formula (3b) is preferably 1:1 to 1:30, more preferably 1:1 to 1:10. By applying such ratio by mass, a perfluoropolyether group-containing silane-based coating which provides a good balance of surface slip property and friction durability can be obtained.

In one embodiment, the fluorine-containing oil comprises one or more compounds of the general formula (3b). In such embodiment, the mass ratio of the fluorine-containing compound having a carbon-carbon unsaturated bond at the molecular terminal to the compound of the formula (3b) in the surface-treating agent is preferably 4:1 to 1:4.

In a preferable embodiment, when a surface-treating layer is formed by using vacuum deposition, an average molecular weight of the fluorine-containing oil may be higher than an average molecular weight of the fluorine-containing compound having a carbon-carbon unsaturated bond at the molecular terminal. By selecting such average molecular weights, more excellent surface slip property and friction durability can be obtained.

From the other point of view, the fluorine-containing oil may be a compound of the general formula $Rf^3-F$ wherein $Rf^3$ is a $C_{5-16}$ perfluoroalkyl group. In addition, the fluorine-containing oil may be a chlorotrifluoroethylene oligomer. The compound of $Rf^3-F$ or the chlorotrifluoroethylene oligomer is preferable because the compounds have high affinity for the fluorine-containing compound having a carbon-carbon unsaturated bond at the molecular terminal wherein a terminal is a $C_{1-16}$ perfluoroalkyl group.

The fluorine-containing oil contributes to increasing of surface slip property of the surface-treating layer.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil.

Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent of the present invention, for example, at 0-300 parts by mass, preferably 0-200 parts by mass with respect to 100 parts by mass of the fluorine-containing compound having a carbon-carbon unsaturated bond at the molecular terminal (as the total mass when two or more compounds are used; hereinafter the same shall apply).

The silicone oil contributes to increasing of surface slip property of the surface-treating layer.

Examples of the above-mentioned catalyst include an acid (for example, acetic acid, trifluoroacetic acid, etc.), a base (for example, ammonia, triethylamine, diethylamine, etc.), a transition metal (for example, Ti, Ni, Sn, etc.), and the like.

When the fluorine-containing compound having a carbon-carbon unsaturated bond at the molecular terminal has a hydrolyzable group, the catalyst facilitates hydrolysis and dehydration-condensation of the compound to facilitate a formation of the surface-treating layer.

The surface-treating agent of the present invention is impregnated into a porous material, for example, a porous ceramic material, a metal fiber for example that obtained by solidifying a steel wool to obtain a pellet. The pellet can be used, for example, in vacuum deposition.

By forming the surface-treating layer on a surface of the base material by using the surface-treating agent of the present invention, the surface-treating layer having high alkali resistance and having water-repellency, oil-repellency, antifouling property (for example, preventing from adhering a fouling such as fingerprints), waterproof property (preventing the ingress of water into an electrical member, and the like), surface slip property (or lubricity, for example, wiping property of a fouling such as fingerprints and excellent tactile feeling in a finger), ultraviolet resistance, and the like depending on a composition of the surface-treating agent used can be obtained.

By applying the surface-treating agent to the nitrided surface, the surface-treating layer having high chemical resistance, in particular high alkali resistance and/or arid resistance in addition to water-repellency, oil-repellency, antifouling property, surface slip property, friction durability can be efficiently formed.

The "nitrided surface" as used herein is a surface having a nitrogen atom, for example, as a SiN moiety or an NH moiety. For example, the nitrided surface can include a surface obtained by the nitriding treatment of the surface of the base material, a surface of the base material formed form nitrides, a surface formed by forming other layer containing a nitrogen atom on the base material, and the like.

When the base material does not have the nitride (nitrogen atom) on its surface, by performing the pretreatment to introduce the nitride to the surface, the surface-treating agent of the present invention can be applied to the surface.

The base material usable in the present invention may be composed of any suitable material such as an inorganic material (for example, a glass, sapphire glass), a resin (may be a natural or synthetic resin such as a common plastic material, specifically an acrylic resin, a polycarbonate resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like.

For example, when an article to be produced is an optical member, a material constituting the surface of the base material may be a material for an optical member, for example, a glass or a transparent plastic. For example, when an article to be produced is an optical member, any layer (or film) such as a hard coating layer or an antireflection layer may be formed on the surface (for example, outermost layer) of the base material. As the antireflection layer, either a single antireflection layer or a multi antireflection layer may be used. Examples of an inorganic material usable in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or SiO are used in the outermost layer. When an article to be produced is an optical glass part for a touch panel, it may have a transparent electrode, for example, a thin layer comprising indium tin oxide (ITO), indium zinc oxide, or the like on a part of the surface of the base material (glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The preferable base material is a glass or a sapphire glass. As the glass, a soda-lime glass, an alkali aluminosilicate glass, a borosilicate glass, a non-alkaline glass, a crystal glass, a quartz glass is preferable, a chemically strengthened soda-lime glass, a chemically strengthened alkali aluminosilicate glass, and a chemically strengthened borosilicate glass are more preferable.

The shape of the base material is not specifically limited. The region of the surface of the base material on which the surface-treating layer should be formed may be at least a part of the surface of the base material, and may be appropriately determined depending on use, the specific specification, and the like of the article to be produced.

In a preferable embodiment, the base material has a Si—N bond or a N—H bond on its surface. The base material further has a Si—H bond or a C—H bond on its surface.

The Si—N bond or the N—H bond (and optionally the Si—H bond or the C—H bond) may be introduced by pretreating the surface of the base material. For example, the Si—N bond, the N—H bond, the Si—H bond or the C—H bond can be introduced by plasma-treating the surface of the base material.

The Si—N bond or the N—H bond may be introduced by forming a layer having the Si—N bond or the N—H bond on its surface.

In one embodiment, the base material can have a diamond-like carbon layer. By forming the diamond-like carbon layer on the base material, the strength of the base material becomes higher. Since the diamond-like carbon layer can carver an oxygen atom on the base material, and has a C—H bond reactive to the surface-treating agent of the present invention, the surface-treating layer having higher durability can be formed.

A method for forming the surface-treating layer on the surface of the base material includes, for example, the following methods.

The formation of the surface-treating layer can be performed by applying the above surface-treating agent on the surface of the base material such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, CVD and a similar method. The specific examples of the deposition method (usually, vacuum deposition) include resistance heating, electron beam, high-frequency heating using microwave, etc., ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

When the wet coating method is used, the surface-treating agent of the present invention is diluted with a solvent, and then it is applied to the surface of the base material. In view of stability of the surface-treating agent of the present invention and volatile property of the solvent, the following solvents are preferably used: a $C_{5-12}$ aliphatic perfluorohydrocarbon (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon (for example, $C_6F_{13}CH_2CH_3$ (for example, ASAHIKLIN (registered trademark) AC-6000 manufactured by Asahi Glass Co., Ltd.), 1,1,2,2,3,3,4-heptafluorocyclopentane (for example, ZEORORA (registered trademark) H manufactured by Nippon Zeon Co., Ltd.); hydrofluorocarbon (HFC) (for example, 1,1,1,3,3-pentafluorobutane (HFC-365mfc)); hydrochlorofluorocarbon (for example, HCFC-225 (ASAHIKLIN (registered trademark) AK225)); a hydrofluoroether (HFE) (for example, an alkyl perfluoroalkyl ether such as perfluoropropyl methyl ether ($C_3F_7OCH_3$) (for example, Novec (trademark) 7000 manufactured by Sumitomo 3M Ltd.), perfluorobutyl methyl ether ($C_4F_9OCH_3$) (for example, Novec (trademark) 7100 manufactured by Sumitomo 3M Ltd.), perfluorobutyl ethyl ether ($C_4F_9OC_2H_5$) (for example, Novec (trademark) 7200 manufactured by Sumitomo 3M Ltd.), and perfluorohexyl methyl ether ($C_2F_5CF(OCH_3)C_3F_7$) (for example, Novec (trademark) 7300 manufactured by Sumitomo 3M Ltd.) (the perfluoroalkyl group and the alkyl group may be liner or branched)), or $CF_3CH_2OCF_2CHF_2$ (for example, ASAHIKLIN (registered trademark) AE-3000 manufactured by Asahi Glass Co., Ltd.), 1,2-dichloro-1,3,3,3-tetrafluoro-1-propene (for example, VERTREL (registered trademark) Sion manufactured by Du Pont-Mitsui Fluorochemicals Co., Ltd.) and the like. These solvents may be used alone or as a mixture of 2 or more compound. Among them, the hydrofluoroether is preferable, perfluorobutyl methyl ether ($C_4F_9OCH_3$) and/or perfluorobutyl ethyl ether ($C_4F_9OC_2H_5$) are particularly preferable. Furthermore, the solvent can be mixed with another solvent, for example, to adjust solubility of the fluorine-containing compound having a carbon-carbon unsaturated bond at the molecular terminal.

When the dry coating method is used, the surface-treating agent of the present invention may be directly subjected to the dry coating method, or may be diluted with a solvent, and then subjected to the dry coating method.

In one embodiment, the formation of the film is preferably performed so that the surface-treating agent of the present invention is present together with a catalyst for a reaction with the base material, for example, a reaction with the Si—H bond or the C—H bond of the base material. Simply, when the wet coating method is used, after the surface-treating agent of the present invention is diluted with a solvent, and just prior to applying it to the surface of the base material, the catalyst may be added to the diluted solution of the surface-treating agent of the present invention. When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal with the surface-treating agent of the present invention to which the catalyst has been added. Alternatively, before the surface-treating agent is provided on the surface of the base material, the catalyst may be present on the surface of the base material.

The catalyst is not particularly limited. For example, a metal catalyst, in particular platinum, palladium, rhodium, or ruthenium can be used, platinum is particularly preferred.

The film is post-treated as necessary. By performing the post-treatment, the bond between the surface-treating layer and the base material can be more strength and the durability is increased. The post-treatment is not particularly limited, and may be a thermal treatment. A temperature of the post-treatment is not particularly limited, and is 60° C. or more, preferably 100° C. or more, and a temperature at which the fluorine-containing compound having a carbon-carbon unsaturated bond at the molecular terminal is not decomposed or less, for example, 250° C. or less, preferably 180° C. or less. The post-treatment is performed preferably under an inert atmosphere, more preferably under vacuum.

In a preferable embodiment, before the surface of the base material is treated with the surface-treating agent, a concave portion may be formed on the surface of the base material. By forming the concave portion on the surface of the base material, when the surface of the base material is treated with the surface-treating agent, the surface-treating agent is filled in the concave portion. The surface-treating agent filled in the concave portion can sustain the function of the surface-treating agent for more long term because when the surface-treating layer is wasted by abrasion during the use, the surface-treating agent filled in the concave portion function so as to supplement the surface-treating agent wasted.

A shape, size and quantity of the concave portion are not particularly limited. It is preferable that the surface state of the base material after the concave portion is formed and before the surface-treating agent is applied is a state where Rmax (maximum height) of the surface of the base material is about 10-50 times, preferably 20-40 times Ra (center line average roughness). It is noted that Ra and Rmax are defined in JIS B0601:1982.

Furthermore, when transparency of the base material is required, Ra is preferably 60 nm or less, more preferably 40 nm or less. By setting Ra to about ⅒ or less of the wavelength of visible light, the transparency of the base material can be ensured.

A method of forming concave portion on the surface of the base material is not particularly limited, and either chemical or physical method may be used, in particular, etching, sputtering or the like can be used.

In a preferable embodiment, the surface-treating layer is formed by performing a pretreatment of the base material so as to form a binding site with a compound in the surface-treating agent used on the surface of the base material; and applying the surface-treating agent of the present invention to the base material subjected to the pretreatment to form the surface-treating layer on the surface of the base material.

Therefore, the present invention provides a method for forming a surface-treating layer on a surface of a base material comprising the steps of:

performing a pretreatment of the base material so as to form a binding site with a carbon-carbon unsaturated bond on the surface of the base material; and applying the surface-treating agent of the present invention to the base material subjected to the pretreatment to form the surface-treating layer on the surface of the base material.

Additionally, the present invention provides an apparatus for performing the method described above, that is, a surface-treating layer forming apparatus for forming a surface-treating layer on a surface of the base material comprising:

a pretreatment unit for performing a pretreatment of the base material to form a binding site with a fluorine-containing compound having a carbon-carbon unsaturated bond at its molecular terminal on the surface of the base material, and a surface-treating layer forming unit for applying the surface-treating agent of the present invention to the base material subjected to the pretreatment to form the surface-treating layer on the surface of the base material.

Hereinafter, the method for forming a surface-treating layer and the apparatus for forming the surface-treating layer of the present invention will be described with reference to the drawings.

Figure 2:
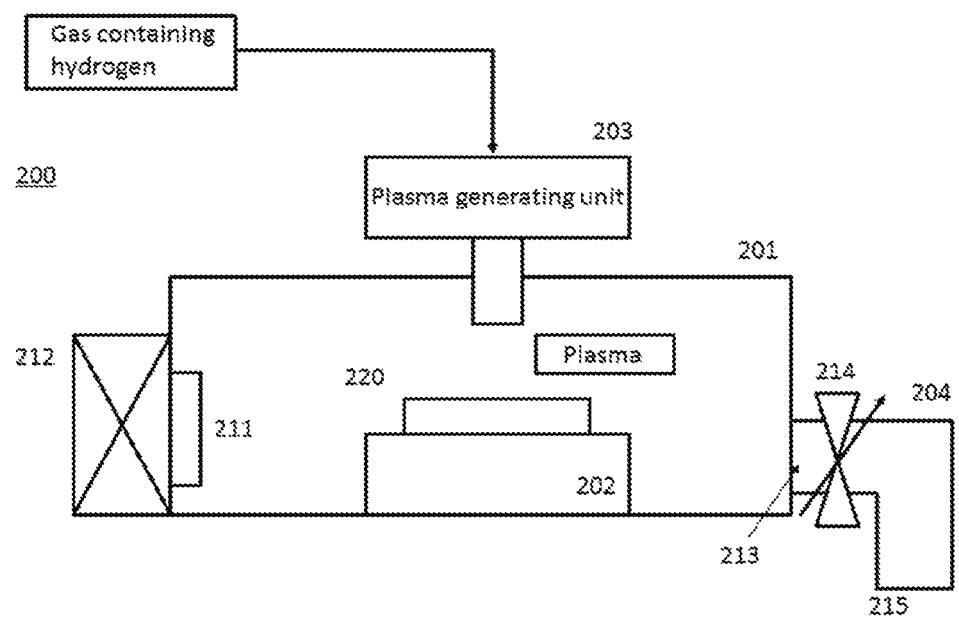
FIG. 2 is a cross-sectional view schematically showing one embodiment of the pretreatment unit 200 in the surface-treating layer forming apparatus shown in FIG. 1.

FIG. 1 is a block diagram showing one embodiment of a surface-treating layer forming apparatus for forming the surface-treating layer on a base material. FIG. 2 is a cross-sectional view schematically showing one embodiment of the pretreatment unit 200.

As shown in FIG. 1, the surface-treating layer forming apparatus 100 comprises a pretreatment unit 200 for performing the pretreatment of the base material, a surface-treating layer forming unit 300 for forming the surface-treating layer on the base material after the pretreatment, a base material transporting unit 400 for transport the base material to the pretreatment unit 200 and the surface-treating layer forming unit 300, a base material importing and exporting unit 500 for importing and exporting the base material, and a control unit 600 for controlling each component of the surface-treating layer forming apparatus 100. The surface-treating layer forming apparatus 100 is structured as a multi-chamber type apparatus. The base material transporting unit 400 comprises a transporting chamber which is maintained in vacuum, and a base material transporting mechanism provided in the transporting chamber. The base material importing and exporting unit 500 comprises a base material holding part and a load-lock chamber, and transports the base material in the base material holding part into the load-lock chamber, and import and export the base material via the load-lock chamber.

The pretreatment unit 200 performs the pretreatment to form a binding site with a fluorine-containing compound having a carbon-carbon unsaturated bond at its molecular terminal on the surface of the base material. In a preferable embodiment, the pretreatment unit 200 performs a surface treatment of the base material to bring a surface state of the base material on which the surface-treating layer will be formed to a state where a surface-treating layer having high density can be formed by the surface-treating agent to be used, and is structured as a plasma treating equipment for controlling amounts of Si, H and N on the surface of the base material 220 in the embodiment.

The pretreatment unit 200 comprises a chamber 201, a base material holder 202 for holding the base material 220 in the chamber 201, a plasma generating unit 203 for generating a plasma and providing the plasma in the chamber 201, and an exhaust mechanism 204 for evacuating the chamber 201.

An importing and exporting port 211 which communicates with the transporting chamber and imports and exports the base material 220 is provided on a side wall of the chamber 201. The importing and exporting port 211 can be opened and closed by a gate valve 212.

The plasma generating unit 203 is supplied with a treatment gas containing silane, ammonia, nitrogen, hydrogen and the like, and generates the plasma containing silane, ammonia, nitrogen, hydrogen and the like by a suitable method such as a microwave plasma, a inductively coupled plasma, a capacitively coupled plasma, or the like and supplies it in the chamber 201.

The exhaust mechanism 204 comprises an exhaust pipe 213 connected to lower portion the chamber 201, a pressure adjustment valve 214 provided in the exhaust pipe 213, and a vacuum pump 215 for exhausting the chamber 201 via the exhaust pipe 213.

In the embodiment, the surface of the base material 220 is treated with the plasma by holding the base material 220 on the base material holder 202, maintaining a predetermined vacuum pressure in the chamber 201, and supplying the plasma containing silane, ammonia, nitrogen, hydrogen and the like to the chamber 201 from the plasma generating unit 203 under such state. Examples of the plasma containing silane, ammonia, nitrogen, hydrogen and the like include, for example, a plasma containing such gases and a rare gas (for example, helium, neon, argon, krypton or xenon) or a hydrogen alone plasma.

Silicon nitride film is formed by the supplied plasma gas.

In one embodiment, the surface of the base material 220 may be directly nitrided by using ammonia, nitrogen, hydrogen, a rare gas.

Next, SAM is formed on the surface of the base material 220 as the surface-treating layer by transferring the base material surface-treated in the pretreatment unit 200 to an organic molecule film forming unit 300, and supplying a SAM material gas to a vicinity of the base material 220.

The control unit 600 comprises a controller provided with a microprocessor (a computer) controlling each component of the apparatus 100. The controller can control, for example, an output, a gas flow rate, and a vacuum level in the pretreatment unit 200, and a flow rate of a carrier gas, a vacuum level of the surface-treating layer forming unit 300. The controller is connected to a user interface including a keyboard that an operator inputs commands for managing the apparatus 100 and a display for displaying visualized images of the operational states of the apparatus 100. The controller is connected to a storage unit that stores control programs for realizing various processes in the surface treatment performed in the apparatus 100 under the control of the controller, process recipes for respective components of the apparatus 100 to perform the processes based on the processing conditions, and various databases. The process recipe is stored in a suitable storage medium in the storage unit. If necessary, by reading the arbitrary process recipe from the storage unit and executing the process on the controller, the desired process is performed in the apparatus 100 under the control of the controller.

The base material used in the method for forming the surface-treating layer and the apparatus for forming the surface-treating layer is not particularly limited, but is preferably a base material having a network structure of Si and O at least on its surface. Examples of the base material include, for example, a glass. By using the base material, it is facilitated to form the S—H bond on the surface of the base material by the pretreatment.

Therefore, in a preferable embodiment, the present invention also provides:

a method for forming a surface-treating layer on a surface of a base material having a network structure of Si and O at least on its surface comprising the steps of performing a pretreatment so as to form a Si—N bond or a N—H bond on the surface of the base material; and applying the surface-treating agent comprising the fluorine-containing compound having a carbon-carbon unsaturated bond at its molecular terminal to the base material subjected to the pretreatment to form the surface-treating layer on the surface of the base material; and a process for producing an article comprising a base material and a surface-treating layer coating a surface of the base material comprising a step of:

contacting the surface-treating agent of the present invention to the surface of the base material so that the fluorine-containing compound having a carbon-carbon unsaturated bond at its molecular terminal contained in the surface-treating agent is reacted with a Si—N part or a N—H part of the surface of the base material to form the surface-treating layer on the surface of the base material.

Since the surface-treating agent of the present invention contains the fluorine-containing compound having a carbon-carbon unsaturated bond at the molecular terminal, the surface-treating agent of the present invention can form the surface-treating layer as long as the binding site with carbon-carbon unsaturated bond is present in the surface of the base material. Therefore, the pretreatment has only to be able to form the Si—N bond on the surface of the base material. For example, a nitrided film forming treatment or a thermal treatment under hydrogen atmosphere, described below, may be performed as the pretreatment.

Nitrided Film Forming Treatment

Silane gas and nitrogen gas of about 3:2 are flowed into a vacuum chamber of a few Pa and a plasma is generated in the vacuum chamber to form the nitrided film. The temperature of the substrate at this time is 200 to 300 degrees.

As described above, the surface-treating layer derived from the film of the surface-treating agent of the present invention is formed on the surface of the base material to produce the article of the present invention.

Therefore, the article of the present invention comprises a base material and a layer which is formed on a surface of the base material from the surface-treating agent (the surface-treating layer).

The present invention provides also a process for producing an article comprising a base material and a surface-treating layer coating a surface of the base material comprising a step of:

contacting the surface-treating agent of the present invention to the surface of the base material so that the fluorine-containing compound having a carbon-carbon unsaturated bond at its molecular terminal contained in the surface-treating agent is reacted with a Si—N part or a N—H part of the surface of the base material to form the surface-treating layer on the surface of the base material.

Since the surface-treating layer obtained by the present invention described above is bonded to the base material by the Si—N—C bond or the N—C bond, the surface-treating layer has high resistance to alkaline and ultraviolet in addition to high physical strength. In addition, the surface-treating layer obtained by the present invention may have water-repellency, oil-repellency, antifouling property (for example, preventing from adhering a fouling such as fingerprints), surface slip property (or lubricity, for example, wiping property of a fouling such as fingerprints and excellent tactile feeling in a finger) depending on a composition of the surface-treating agent used, thus may be suitably used as a functional thin film.

Therefore, the present invention further provides an optical material having the hardened material on the outermost layer.

Examples of the optical material include preferably a variety of optical materials in addition to the optical material for displays, or the like exemplified in below: for example, displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a protective plate of such displays, or that in which these displays and protective plates have been subjected to antireflection treatment on their surface.

The article having the surface-treating layer obtained according to the present invention is not specifically limited to, but may be an optical member. Examples of the optical member include the followings: lens of glasses, or the like; a front surface protective plate, an antireflection plate, a polarizing plate, or an anti-glare plate on a display such as PDP and LCD; a touch panel sheet of an instrument such as a mobile phone or a personal digital assistance; a disk surface of an optical disk such as a Blu-ray disk, a DVD disk, a CD-R or MO; an optical fiber; a display surface of a watch, and the like.

The article having the surface-treating layer obtained according to the present invention may be also a medical equipment or a medical material.

The thickness of the surface-treating layer is not specifically limited. For the optical member, the thickness of the surface-treating layer is within the range of 1-50 nm, 1-30 nm, preferably 1-15 nm, in view of optical performance, surface slip property, friction durability and antifouling property.

Hereinbefore, the article produced by using the surface-treating agent of the present invention is described in detail. It is noted that an application, a method for using or a method for producing the article are not limited to the above exemplification.

Example 1

Formation of Surface-Treating Layer

A glass was prepared as the base material, and a silicon nitride film was formed on the surface of the glass by using a plasm CVD. In this time, in the CVD, $SiH_4$ and $N_2$ gas were used. A Si—N bond was formed by forming the silicon nitride film. The surface-treating layer was formed on the surface of the glass treated by using the surface-treating agent containing a fluorine-containing compound having the following average composition by vacuum deposition under the following condition.

Fluorine-containing compound:

wherein n is an integer of 20.

Vacuum Deposition Conditions

Equipment vacuum level: 1E-4 Pa

Temperature of the compound at the time of deposition: 200° C.

Temperature of the base material: room temperature (not controlled)

Deposition time: 16 minutes.

After the vacuum deposition, the formation of $CF_x$ layer was confirmed based on the observation of orbital energy spectrum of C1s of the surface-treating layer by using X-ray photoelectron spectroscopy (XPS). In addition, the static water contact angle of the surface-treating layer was measured for 5 μL of water at 25° C. by using a contact angle measuring instrument (manufactured by KYOWA INTERFACE SCIENCE Co., Ltd.). The result was not less than 110°.

Examination Example (Alkali Resistance Test)

An aqueous alkaline solution (25 wt % of aqueous KOH solution at pH 14) was added dropwise on the surface of the glass on which the surface-treating layer formed as described above, and then the glass was allowed to stand for 30 minutes. Then, the surface-treating layer was observed by using a XPS analysis. Chemical changes in the surface-treating layer could not be observed 30 minutes after the adding dropwise of the aqueous alkaline solution since a peak shift of C1s orbital was changed. In addition, the static water contact angle was measured as described above. The result was not less than 110°.

From the above results, it was confirmed that the surface-treating layer having high alkali resistance can be formed by using the surface-treating agent of the present invention.

INDUSTRIAL APPLICABILITY

The present invention can be suitably used for forming the surface-treating layer on a surface of a base material, in particular an optical member.

EXPLANATION OF THE REFERENCE NUMERALS

100: surface-treating layer forming apparatus
200: pretreatment unit
300: surface-treating layer forming unit
400: base material transporting unit
500: base material importing and exporting unit
600: control unit
201: chamber
202: base material holder
203: plasma generating unit
204: exhaust mechanism
211: importing and exporting port
212: gate valve
213: exhaust pipe
214: pressure adjustment valve
215: vacuum pump
220: base material

The invention claimed is:

1. A surface-treating agent for a nitrided surface, comprising a fluorine-containing compound having a carbon-carbon unsaturated bond at its molecular terminal as a group of —Y-A wherein Y is a single bond, an oxygen atom or a divalent organic group, and A is —CH=$CH_2$ or —C≡CH, wherein the fluorine-containing compound having a carbon-carbon unsaturated bond at its molecular terminal is at least one compound of any of the following formulae (A1), (A2), (C1), (C2), (E1) and (E2):

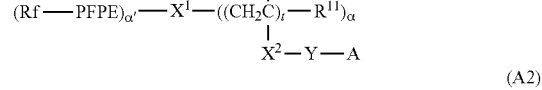

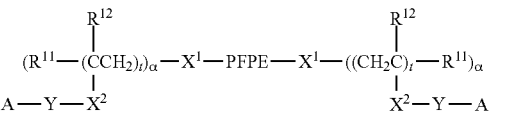

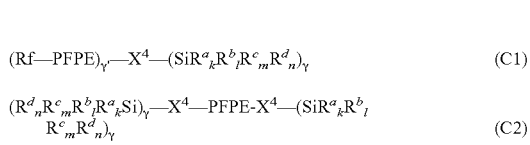

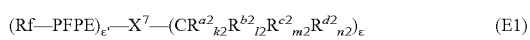

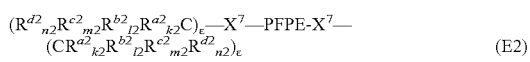

wherein:

A is each independently at each occurrence —CH=$CH_2$ or —C≡CH;

Y is each independently at each occurrence a single bond, an oxygen atom or a divalent organic group;

Rf is each independently an alkyl group having 1-16 carbon atoms which may be substituted by one or more fluorine atoms;

PFPE is each independently —$(OC_4F_8)_a$—$(OC_3F_6)_b$—$(OC_2F_4)_c$—$(OCF_2)_d$—, wherein a, b, c and d are each independently an integer of 0 or more and 200 or less, the sum of a, b, c and d is 1 or more, and the occurrence order of the respective repeating units in parentheses with the subscript a, b, c or d is not limited in the formula;

$R^{11}$ is each independently a hydrogen atom or a halogen atom;

$R^{12}$ is each independently at each occurrence a hydrogen atom or a lower alkyl group;

$X^1$ is each independently a single bond or a 2-10 valent organic group;

$X^2$ is each independently at each occurrence a single bond or a divalent organic group;

t is each independently an integer of 2-10;

α is each independently an integer of 1-9;

α' is each independently an integer of 1-9;

$X^4$ is each independently a single bond or a 2-10 valent organic group;

γ is each independently an integer of 1-9;

γ' is each independently an integer of 1-9;

$R^a$ is each independently at each occurrence —Z—$SiR^{71}_p R^{72}_q R^{73}_r R^{74}_s$;

Z is each independently at each occurrence an oxygen atom or a divalent organic group;

$R^{71}$ is each independently at each occurrence $R^{a'}$;

$R^{a'}$ has the same definition as that of $R^a$;

in $R^a$, the number of Si atoms which are straightly linked via the Z group is up to five;

$R^{72}$ is each independently at each occurrence —$X^5$—Y-A;

$X^5$ is each independently at each occurrence a single bond or a divalent organic group;

$R^{73}$ is each independently at each occurrence a hydroxyl group or a hydrolyzable group;
$R^{74}$ is each independently at each occurrence a hydrogen atom or a lower alkyl group;
p is each independently at each occurrence an integer of 0-3;
q is each independently at each occurrence an integer of 0-3;
r is each independently at each occurrence an integer of 0-3;
s is each independently at each occurrence an integer of 0-3;
with the proviso that (p+q+r+s) is 3;
$R^b$ is each independently at each occurrence —$X^5$—Y-A;
$R^c$ is each independently at each occurrence a hydroxyl group or a hydrolyzable group;
$R^d$ is each independently at each occurrence a hydrogen atom or a lower alkyl group;
k is each independently at each occurrence an integer of 0-3;
l is each independently at each occurrence an integer of 2-3;
m is each independently at each occurrence an integer of 0-3;
n is each independently at each occurrence an integer of 0-3;
with the proviso that (k+l+m+n) is 3, and there is at least one the Y-A group in —$(SiR^a{}_k R^b{}_l R^c{}_m R^d{}_n)_{r'}$;
$X^7$ is each independently, a single bond or a divalent organic group;
ε is each independently an integer of 1-9;
ε' is each independently an integer of 1-9;
$R^{a2}$ is each independently at each occurrence, —$Z^2$— $CR^{75}{}_{p2} R^{76}{}_{q2} R^{77}{}_{r2} R^{78}{}_{s2}$;
$Z^2$ is each independently at each occurrence, an oxygen atom or a divalent organic group;
$R^{75}$ is each independently at each occurrence, $R^{a2'}$;
$R^{a2'}$ has the same definition as that of $R^{a2}$;
in $R^{a2}$, the number of C atoms which are straightly linked via the Z group is up to five;
$R^{76}$ is each independently at each occurrence, —$X^8$—Y-A;
$X^8$ is each independently at each occurrence, a single bond or a divalent organic group;
$R^{77}$ is each independently at each occurrence, a hydroxyl group or a hydrolyzable group;
$R^{78}$ is each independently at each occurrence, a hydrogen atom or a lower alkyl group;
p2 is each independently at each occurrence, an integer of 0-3;
q2 is each independently at each occurrence, an integer of 0-3;
r2 is each independently at each occurrence, an integer of 0-3;
s2 is each independently at each occurrence, an integer of 0-3;
with the proviso that (p2+q2+r2+s2) is 3;
$R^{b2}$ is each independently at each occurrence, —$X^8$—Y-A;
$R^{c2}$ is each independently at each occurrence, a hydroxyl group or a hydrolyzable group;
$R^{d2}$ is each independently at each occurrence, a hydrogen atom or a lower alkyl group;
k2 is each independently at each occurrence an integer of 0-3;
l2 is each independently at each occurrence an integer of 2-3;
m2 is each independently at each occurrence, an integer of 0-3; and
n2 is each independently at each occurrence, an integer of 0-3;
with the proviso that (k2+l2+m2+n2) is 3, and there is at least one the Y-A group in —$(CR^{a2}{}_{k2} R^{b2}{}_{l2} R^{c2}{}_{m2} R^{d2}{}_{n2})_{\varepsilon'}$.

2. The surface-treating agent for a nitrided surface according to claim 1 wherein A is —CH=$CH_2$.

3. The surface-treating agent for a nitrided surface according to claim 1 wherein Y is a single bond, an oxygen atom or —$CR^{14}{}_2$—, and
$R^{14}$ is a hydrogen atom or a lower alkyl group.

4. The surface-treating agent for a nitrided surface according to claim 1 wherein Rf is a perfluoroalkyl group having 1-16 carbon atoms.

5. The surface-treating agent for a nitrided surface according to claim 1 wherein
PFPE is a group of any of the following formulae (a)-(c):

$$-(OC_3F_6)_b- \quad (a)$$

in the formula (a), b is an integer of 1 or more and 200 or less;

$$-(OC_4F_8)_a-(OC_3F_6)_b-(OC_2F_4)_c-(OCF_2)_d- \quad (b)$$

in the formula (b), a and b is each independently an integer of 0 or more and 30 or less, c and d is each independently an integer of 1 or more and 200 or less, the sum of a, b, c and d is an integer of 10 or more and 200 or less, and the occurrence order of the respective repeating units in parentheses with the subscript a, b, c or d is not limited in the formula, and $$-(OC_2F_4-R^{15})_{n''}- \quad (c)$$

in the formula (c), $R^{15}$ is each independently a group selected from $OC_2F_4$, $OC_3F_6$ and $OC_4F_8$, and n" is an integer of 2-100.

6. The surface-treating agent for a nitrided surface according to claim 1 wherein
in PFPE:
$OC_4F_8$ is $OCF_2CF_2CF_2CF_2$,
$OC_3F_6$ is $OCF_2CF_2CF_2$, and
$OC_2F_4$ is $OCF_2CF_2$.

7. The surface-treating agent for a nitrided surface according to claim 1 wherein
$X^2$ is —$(CH_2)_u$—, and
u is an integer of 0-2.

8. The surface-treating agent for a nitrided surface according to claim 1 wherein the fluorine-containing compound having a carbon-carbon unsaturated bond at its molecular terminal is at least one compound of any of the formulae (A1) and (A2).

9. The surface-treating agent for a nitrided surface according to claim 1 wherein the fluorine-containing compound having a carbon-carbon unsaturated bond at its molecular terminal is at least one compound of any of the formulae (C1) and (C2).

10. The surface-treating agent for a nitrided surface according to claim 1 wherein the fluorine-containing compound having a carbon-carbon unsaturated bond at its molecular terminal is at least one compound of any of the formulae (E1) and (E2).

11. The surface-treating agent for a nitrided surface according to claim 1 further comprising one or more components selected from a fluorine-containing oil, a silicone oil, and a catalyst.

12. The surface-treating agent for a nitrided surface according to claim 11 wherein the fluorine-containing oil is one or more compounds of the formula (3):

$$Rf^1-(OC_4F_8)_{a'}-(OC_3F_6)_{b'}-(OC_2F_4)_{c'}-(OCF_2)_{d'}-Rf^2 \quad (3)$$

wherein:
Rf$^1$ is an alkyl group having 1-16 carbon atoms which may be substituted by one or more fluorine atoms;
Rf$^2$ is an alkyl group having 1-16 carbon atoms which may be substituted by one or more fluorine atoms, a fluorine atom or a hydrogen atom;
a', b', c' and d' are the repeating number of each of four repeating units of perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

13. The surface-treating agent for a nitrided surface according to claim 11 wherein the fluorine-containing oil is one or more compounds of the formula (3a) or (3b):

$$Rf^1-(OCF_2CF_2CF_2)_{b''}-Rf^2 \quad (3a)$$

$$Rf^1-(OCF_2CF_2CF_2CF_2)_{a''}-(OCF_2CF_2CF_2)_{b''}-(OCF_2CF_2)_{c''}-(OCF_2)_{d''}-Rf^2 \quad (3b)$$

wherein:
Rf$^1$ is an alkyl group having 1-16 carbon atoms which may be substituted by one or more fluorine atoms;
Rf$^2$ is an alkyl group having 1-16 carbon atoms which may be substituted by one or more fluorine atoms, a fluorine atom or a hydrogen atom;
in the formula (3a), b'' is an integer of 1 or more and 100 or less;
in the formula (3b), a'' and b'' are each independently an integer of 0 or more and 30 or less, and c'' and d'' are each independently an integer of 1 or more and 300 or less; and
the occurrence order of the respective repeating units in parentheses with the subscript a'', b'', c'' or d'' is not limited in the formula.

14. The surface-treating agent for a nitrided surface according to claim 1 further comprising a solvent.

15. The surface-treating agent for a nitrided surface according to claim 1 which is an antifouling-coating agent or a water-proof coating agent.

16. The surface-treating agent for a nitrided surface according to claim 1 wherein the nitrided surface is a layer having a Si—N bond or a N—H bond on its surface.

17. An article comprising a base material and a layer which is formed on a surface of the base material from the surface-treating agent for a nitrided surface according to claim 1.

18. The article according to claim 17 wherein the base material is a glass or a sapphire glass having a nitrided surface.

19. The article according to claim 18 wherein the glass is a glass selected from the group consisting of a soda-lime glass, an alkali aluminosilicate glass, a borosilicate glass, a non-alkaline glass, a crystal glass and a quartz glass.

20. The article according to claim 17 wherein the base material has a diamond-like carbon layer.

21. The article according to claim 17 which is an optical member.

22. The surface-treating agent for a nitrided surface according to claim 1 wherein X$^1$, X$^4$, and X$^7$ are a 2-4 valent organic group, α, γ, and ε are 1-3, and α', γ', and ε' are 1.

23. The surface-treating agent for a nitrided surface according to claim 1 wherein X$^1$, X$^4$ and X$^7$ are a divalent organic group, α, γ, and ε are 1, and α', γ', and ε' are 1.

24. The surface-treating agent for a nitrided surface according to claim 1 wherein X$^1$, X$^4$, and X$^7$ are each independently $$-(R^{31})_{p'}-(X^a)_{q'}-R^{32}-$$

wherein:
R$^{31}$ is a single bond, —(CH$_2$)$_{s'}$— (wherein s' is an integer of 1-20) or an o-, m- or p-phenylene group;
R$^{32}$ is a single bond, —(CH$_2$)$_{t'}$— (wherein t' is an integer of 1-20) or an o-, m- or p-phenylene group;
X$^a$ is —(X$^b$)$_{r'}$— (wherein r' is an integer of 1-10);
X$^b$ is each independently at each occurrence a group selected from the group consisting of —O—, —S—, an o-, m- or p-phenylene group, —C(O)O—, —Si(R$^{33}$)$_2$—, —(Si(R$^{33}$)$_2$O)$_{m'}$—Si(R$^{33}$)$_2$— (wherein m' is an integer of 1-100), —CONR$^{34}$—, —O—CONR$^{34}$—, —NR$^{34}$— and —(CH$_2$)$_{n'}$— (wherein n' is an integer of 1-20);
R$^{33}$ is each independently at each occurrence a phenyl group, a C$_{1-6}$ alkyl group or a C$_{1-6}$alkoxy group;
R$^{34}$ is each independently at each occurrence a hydrogen atom, a phenyl group or a C$_{1-6}$alkyl group;
p' is 0 or 1;
q' is 0 or 1;
at least one of p' and q' is 1, the occurrence order of the respective repeating units in parentheses with the subscript p' or q' is not limited in the formula; and
R$^{31}$, R$^{32}$ and X$^a$ may be substituted with one or more substituents selected from a fluorine atom, a C$_{1-3}$ alkyl group and a C$_{1-3}$ fluoroalkyl group.

25. The surface-treating agent for a nitrided surface according to claim 1 wherein X$^1$, X$^4$, and X$^7$ are each independently selected from the group consisting of:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—

—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—(CH$_2$)$_2$—Si(CH$_3$)$_2$—(CH$_2$)$_2$—
—CONH—(CH$_2$)$_3$—,
—CON(CH$_3$)—(CH$_2$)$_3$—,
—CON(Ph)-(CH$_2$)$_3$— (wherein Ph is a phenyl group),
—CONH—(CH$_2$)$_6$—,
—CON(CH$_3$)—(CH$_2$)$_6$—,
—CON(Ph)-(CH$_2$)$_6$— (wherein Ph is a phenyl group),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$OSi(CH$_3$)$_2$(CH$_2$)$_2$—
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

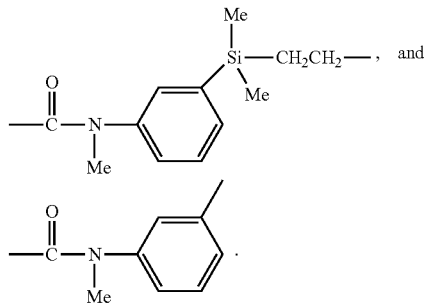

26. The surface-treating agent for a nitrided surface according to claim 1 wherein
$X^1$ is —O—CFR$^{13}$—(CF$_2$)$_e$—,
$R^{13}$ is a fluorine atom or a lower fluoroalkyl group, and e is 0 or 1.

* * * * *